United States Patent
Rudakevych

(10) Patent No.: US 7,926,598 B2
(45) Date of Patent: Apr. 19, 2011

(54) MOBILE ROBOTIC VEHICLE

(75) Inventor: Pavlo E. Rudakevych, Arroyo Grande, CA (US)

(73) Assignee: iRobot Corporation, Bedford, MA (US)

(*) Notice: Subject to any disclaimer, the term of this patent is extended or adjusted under 35 U.S.C. 154(b) by 0 days.

(21) Appl. No.: 12/331,380

(22) Filed: Dec. 9, 2008

(65) Prior Publication Data
US 2010/0139995 A1 Jun. 10, 2010

(51) Int. Cl.
*B62D 55/00* (2006.01)

(52) U.S. Cl. .................. 180/9.32; 180/8.1; 180/9.28

(58) Field of Classification Search ............ 180/9.32, 180/9.28, 8.2, 8.7, 9.1, 907, 8.5
See application file for complete search history.

(56) References Cited

U.S. PATENT DOCUMENTS

| | | | |
|---|---|---|---|
| 3,166,138 A * | 1/1965 | Dunn, Jr. ............... | 180/9.23 |
| 6,263,989 B1 * | 7/2001 | Won ................... | 180/9.32 |
| 6,431,296 B1 * | 8/2002 | Won ................... | 180/9.32 |
| 6,615,885 B1 | 9/2003 | Ohm | |
| 6,668,951 B2 * | 12/2003 | Won ................... | 180/9.1 |
| 6,809,490 B2 | 10/2004 | Jones et al. | |
| 6,883,201 B2 | 4/2005 | Jones et al. | |
| 7,011,171 B1 | 3/2006 | Poulter | |
| 7,459,871 B2 | 12/2008 | Landry et al. | |
| 7,546,891 B2 * | 6/2009 | Won ................... | 180/9.32 |
| 7,581,605 B2 * | 9/2009 | Caspi et al. ........... | 180/9.1 |
| 7,654,348 B2 * | 2/2010 | Ohm et al. ............. | 180/9.32 |
| 2002/0062999 A1 * | 5/2002 | De-Noor et al. ......... | 180/9.21 |
| 2003/0183428 A1 * | 10/2003 | Hedeen ............... | 180/9.32 |
| 2007/0029117 A1 | 2/2007 | Goldenberg et al. | |
| 2008/0086241 A1 | 4/2008 | Phillips et al. | |
| 2008/0179115 A1 * | 7/2008 | Ohm et al. ............. | 180/9.21 |
| 2008/0196946 A1 * | 8/2008 | Filippov et al. ......... | 180/9.1 |
| 2008/0223630 A1 * | 9/2008 | Couture et al. .......... | 180/9.32 |
| 2009/0065271 A1 * | 3/2009 | Won ................... | 180/9.32 |
| 2009/0314554 A1 * | 12/2009 | Couture et al. .......... | 180/8.7 |

FOREIGN PATENT DOCUMENTS

WO    WO 2005/105388    11/2005

OTHER PUBLICATIONS

Barnes, M., Everett, H.R., and P. Rudakevych; "ThrowBot: Design Considerations for a Man-Portable Throwable Robot"; SPIE Proc. 5804; Unmanned Ground Vehicle Technology VII, Orlando, FL, Mar. 29-31, 2005 (10 pages).
LANdroids; BAA-07-46 Proposer Information Pamphlet for Defense Advanced Research Projects Agency; Information Processing Technology Office, 2007 (34 pages).

(Continued)

*Primary Examiner* — Joanne Silbermann
*Assistant Examiner* — Tashiana Adams
(74) *Attorney, Agent, or Firm* — Fish & Richardson P.C.

(57) ABSTRACT

A mobile robot includes a robot chassis having a forward end, a rearward end and a center of gravity. The robot includes a driven support surface to propel the robot and first articulated arm rotatable about an axis located rearward of the center of gravity of the robot chassis. The arm is pivotable to trail the robot, rotate in a first direction to raise the rearward end of the robot chassis while the driven support surface propels the chassis forward in surmounting an obstacle, and to rotate in a second opposite direction to extend forward beyond the center of gravity of the robot chassis to raise the forward end of the robot chassis and invert the robot endwise.

13 Claims, 17 Drawing Sheets

OTHER PUBLICATIONS

SuperDroid Robots, Inc.; SuperDroid Robts; Robots, Parts and Custom Solutions; LT-F Data Sheet; www.SuperDroidRobots.com; Revised Jul. 20, 2009 (7 pages).

International Search Report and Written Opinion in connection with International Application No. PCT/US2008/086106, dated Oct. 15, 2009. 18 pages.

SuperDroid Robots, LT-F Compact Treaded All Terrain Surveillance & Inspection Robot, Dec. 17, 2008, pp. 1-5.

SuperDroid Robots, Treaded All Terrain LT Robot Support Page, Jul. 2008.

SuperDroid Robots, LT-F Tracked Robot with Flipper-Stabilizer Arm Kit, Jul. 2008.

* cited by examiner

MOBILE ROBOTIC VEHICLE

STATEMENT AS TO FEDERALLY SPONSORED RESEARCH

This invention was made in part with Government support under contract #FA8650-08-C-7815 entitled "Ember: a Small, Inexpensive, and Smart Mobile Communications Relay Platform" awarded by the DARPA IPTO LANdroids program. The Government may have certain rights in the invention.

BACKGROUND

The invention relates generally to robotic mobile platforms.

Robots are useful in a variety of civilian, military, and law enforcement applications. For instance, a robotically controlled mobility platform can be used to inspect or search buildings under hazardous or hostile conditions. Dangerous situations can be improved by providing detailed information about the location, activities, and capabilities of opponents. Military applications can include reconnaissance, surveillance, bomb disposal and security patrols.

Advances are sought in the miniaturization of robots and the ability of robots to surmount obstacles.

SUMMARY

The details of one or more embodiments of the invention are set forth in the accompanying drawings and the description below. Other features, objects, and advantages of the invention will be apparent from the description and drawings, and from the claims.

One aspect of the invention features a mobile robot including a robot chassis having a forward end, a rearward end and a center of gravity. The robot further includes a driven support surface connected to the chassis and configured to propel the robot chassis forward and rearward. A first articulated arm is rotatable about an axis located rearward of the center of gravity of the robot chassis and is configured to: trail the robot, rotate in a first direction, raise the rearward end of the robot chassis while the driven support surface propels the chassis forward in surmounting an obstacle, and rotate in a second opposite direction to extend forward beyond the center of gravity of the robot chassis to raise the forward end of the robot chassis and invert the robot endwise.

In some embodiments, the driven support surface includes a flexible track trained about a pair of wheels.

In some embodiments, the axis of the arm is coaxial with an axis of a one of the wheels.

In some embodiments, the robot includes a second articulated arm rotatable about the axis with the first articulated arm.

In some embodiments, the first and second arms are located outward of the driven support surface and are continuously rotatable in either direction. In some embodiments, an axle connects the first and second arms and an idler wheel is freely rotatable about the axle.

In some embodiments, the first arm is located substantially along a central longitudinal axis of the robotic chassis. In some cases, the first arm is configured with a camera.

In some embodiments, the first arm is continuously rotatable to provide a swimming-type propulsion.

In some embodiments, the first arm is configured to rotate as a function of an angle of incline of the robot chassis.

In some embodiments, a duration of rotation of the first arm is predetermined as a function of an angle of incline of the robot chassis.

In some embodiments, the robot includes a radio transceiver and the first arm is rotatable to raise the robot chassis to elevate the transceiver. In some cases, the robot is a mobile mesh network node robot.

In some embodiments, the robot includes a cliff detector at the forward end and a proximity sensor on a side of the robot. In some cases, the robot is configured to maintain a fixed proximity to a detected obstacle. In some cases, the fixed proximity is maintained by comparing readings from the first proximity sensor and a second proximity sensor and turning the vehicle to substantially equilibrate the readings.

In some embodiments, the robot includes an angular rate sensor, configured to detect an impact of the robot with an obstacle and an angle of incline of the robot.

In some embodiments, the robot includes a slip clutch between the first arm and a first arm drive motor.

In some embodiments, a pull pin is removably received by the chassis. In some cases, the pull pin locks the first arm in a stowed position. In some cases, the pull pin immobilizes the first arm. In some cases, the pull pin is configured to power-on the vehicle upon removal from the chassis. In some eases, the pull pin is configured to release an antenna from a stowed position and to unlock the first arm from a stowed position.

In some embodiments, the vehicle substantially fits within a bounding volume approximately 7 inches long, 5 inches wide and 2 inches tall.

In some embodiments, the first arm is rotatable to align with a horizontal axis of the vehicle. In some eases, the vehicle is configured to fit in a combat uniform cargo pants pocket.

Another aspect of the invention features a method for operating a mobile robotic vehicle having a driven support surface and a first pivoting trailing arm to surmount obstacles including a series of stair risers. The method includes driving the support surface to propel the vehicle to contact the riser of a first stair with a forward end of the vehicle, and driving the support surface to cause the forward end of the vehicle to ascend the riser of the first stair. The method further includes pivoting the first arm to raise a rearward end of the vehicle as the forward end of the robot approaches the top of the riser of the first stair; driving the support surface to advance the forward end of the robot over the top of the stair riser; and pivoting the arm to further raise the rearward end of the vehicle such that the forward end of the vehicle rotates downward beyond the top of the riser of the first stair.

In some applications, the method includes repeating the driving and pivoting to surmount a second stair.

In some applications, the method includes pivoting the arm to raise the forward end of the vehicle above an underlying surface.

In some applications, the method includes further pivoting the arm to flip the robot endwise.

In some applications, raising the forward end of the vehicle raises a radio transceiver on the vehicle.

In some applications, the method includes supporting the vehicle in a first substantially horizontal orientation on an underlying surface, pivoting the arm to contact the underlying surface to raise the forward end of the vehicle and further pivoting the arm to rotate the forward end of the vehicle past a stable point and allowing the vehicle to topple over to a second orientation inverted with respect to the first orientation.

In some applications, the first arm is pivoted to raise the rear end of the chassis to maintain a chassis angle of incline of less than about 45 degrees as the forward end of the chassis surmounts a stair riser.

In some cases, the stair risers comprises spaced apart obstacles including a rise in elevation.

In some applications, pivoting the first arm and driving the support surface are performed simultaneously. In some applications, the pivoting the first arm and driving the support surface are performed substantially asynchronously.

In some applications, the support surface propels the vehicle to a predetermined angle of incline before the first arm is initially pivoted to raise the rearward end of the vehicle.

In some applications, the support surface is further driven while the first arm is further pivoted to surmount the riser.

In some applications, the first arm is pivoted at a predetermined rate for a predetermined period upon detection of a predetermined angle of incline of the vehicle.

In some applications, the first arm is pivotally retracted to a point above the bottom of the driven support surface upon the vehicle surmounting the riser.

In some applications, the first arm is pivotally retracted to a predetermined angle to provide clearance for the vehicle to ascend a second riser to a predetermined angle of incline before the first arm contacts an underlying surface.

In some applications, the method includes detecting when the robot hits an obstacle and generating a random recoil turn rate command.

In some applications, the method includes propelling the vehicle backwards at a preset speed while turning at the random recoil turn rate for a fixed period of time or until the vehicle hits another obstacle moving backwards.

In some applications, the method includes, upon detection of impact of the vehicle with an obstacle while moving backwards, generating a second random recoil turn rate and propelling the vehicle forward at a preset speed while turning at the second turn rate.

In some applications, the method includes detecting an obstacle at a distance and turning the vehicle to avoid the vehicle.

In some applications, the method includes propelling the vehicle in a spiral pattern at a preset speed and a preset diminishing turn rate until an obstacle is detected.

Another aspect of the invention features a robot including a body and a differential drive supporting the body. The differential drive includes a left drive motor that turns a left drive wheel and a right drive motor that turns a right drive wheel, each of the left drive wheels and right drive wheel are turned about a common first axis. A flipper arm includes a pivot end and a distal end, the flipper arm being supported with respect to the body to pivot about a second axis parallel to the common drive axis to revolve the distal end about the second axis. A flipper drive, including a flipper drive motor, is connected to the flipper arm to drive the flipper arm through a continuous 360 degrees of revolution about the pivot axis. A left motor circuit controls the left motor, a right motor circuit controls the right motor and a flipper motor circuit controls the flipper motor. A body attitude sensor measures till of the body from the direction of gravity, about a third axis parallel to the first axis. A flipper angle sensor measures angular position of the flipper about the second axis. A microcontroller commands the left motor circuit, right motor circuit, and flipper motor circuit and includes an obstacle climbing routine that monitors the body attitude sensor and the flipper angle sensor. The obstacle climbing routine commands the flipper motor circuit to (a) move the flipper to revolve to a position substantially extending along the ground as the differential drive climbs a face of an obstacle, and (b) move the flipper to revolve between the position extending along the ground to a position extending below the body as the differential drive drives forward and overcomes a top of the face of the obstacle, thereby tipping the body over the top of the face of the obstacle.

In some cases, the flipper is moved to extend along the ground when the body passes more than a certain acute angle, e.g., 45 degrees, from horizontal. For example, the flipper is moved to be positioned about the same acute angle from a direction normal to the top of the body.

In some cases, the body includes a frame chassis, monocoque or unibody hull.

Another aspect of the invention features a method of robot obstacle climbing. The method includes monitoring an attitude of a robot body having a differential drive, monitoring an angle of a pivoting flipper with respect to the robot body; pivoting the flipper to a position extending along the ground as the differential drive climbs a face of an obstacle. The flipper is pivoted from the position extending along the ground to a position extending below the body as the differential drive drives forward and overcomes a top of the face of the obstacle, in order to tip the body over the top of the face of the obstacle as the distal end of the flipper supports the body below the top of the face of the obstacle.

Another aspect of the invention features a ground robot including a substantially box-like rectangular body no more than two inches in height, ten inches in length, and ten inches in width, and having a leading end and a trailing end, and having no more than 1 kg mass. A differential drive supports the body and includes a left driven track and a right driven track each no less than ½ inch in width, differentially driven about a drive axis. A flipper arm having a pivot end and a distal end is supported at its pivot end from the body no more than three inches from the trailing end of the body to pivot about a flipper axis parallel to the drive axis. The flipper arm is rotatable throughout a continuous 360 degrees of revolution about the pivot axis.

In some cases the differential drive includes tracks with sufficient traction to climb the leading end of an obstacle composed of common materials such as wood, asphalt and concrete by driving the leading end of the tracks up a face of an obstacle while the trailing end tracks drives along the ground.

In some applications, the robot is configured to prevent the robot from sliding back down the obstacle when the leading end of the track clears the top of the obstacle, and to hold and advance the robot at the top of the obstacle as the trailing end of the tracks are lifted off the ground.

In some applications, the differential drive propels the robot forward to drag the distal end of the flipper arms along the ground as the flippers are rotated in to swing the distal ends of the flippers in the same direction as the robot is advancing.

In some cases, the flippers are less than 3% of the total weight of the robot and do not appreciably move the center of gravity of the robot during rotation of the flippers. In some cases, the distal ends of the flippers are sized to partially penetrate into certain loose terrains such as snow, sand and gravel. The flippers are substantially rigid to resist bending.

In some case the distal ends of the flippers are rounded or tapered to slide along normal surfaces such as wood, asphalt, and concrete as the robot advances over the top of an obstacle using just the traction of the leading ends of the tracks.

In some cases the distal ends of the flippers are rounded to permit the distal end of the flipper to slip through and past a bottom dead center position in order to push the trailing end of the robot as high as possible before the robot is finally driven to overcome the obstacle.

In some embodiments, the robot is sized to be readily portable, and to substantially fit within a bounding volume approximately 18 cm (7 in.) long, 12 cm (5 inches) wide and 5 cm (2 inches) tall. A trailing pivoting arm allows the compact robot to climb obstacles as big as itself, including stairs. A particular small robot embodiment is about 13 cm (5") axle to axle, 3 cm (1") diameter wheels with a 15 cm (6") overall length, capable of climbing about obstacles up to about 13 cm (5"). Such compact embodiments can be carried in the various pockets and poaches contained in the law enforcement or militia uniforms. Another embodiment is scaled large enough to climb standard stairs 17-20 cm (7"-8"). These robots are well-suited to urban settings such as on rooftops, sidewalks, stair wells, streets and in indoor residential and office environments.

In use, the robot is removed from a pocket, a deactivation plug or pin is removed from the side of the robot and the robot is placed or even tossed in a suitable location. This process can be repeated to create a multi-node mesh communications network. Multiple robots can act as radio relays, forming multi-hop communications paths that allow operations over greater ranges. Relay chains are particularly useful for missions in urban terrain or to extend communications around corners, and into cave/tunnel complexes and bunkers, allowing access to more remote areas that a single robot could not access.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Various tracked robotic vehicles have been developed that are the subject of, for example, U.S. Pat. Nos. 6,431,296, 6,263,989, 6,668,951 and 6,615,885. These patents are instructive on the construction of tracked robotic vehicles having driven flippers, and means of articulation of robotic components, and are hereby incorporated by reference in their entirety into this application.

Autonomous control routines and control systems useful, for example, to avoid an obstacle, escape an area, or navigate an area, optimize communications or coverage or seek radio performance are disclosed in U.S. patent application Ser. No. 11/633,869 filed Dec. 4, 2006 and titled "AUTONOMOUS COVERAGE NAVIGATION SYSTEM," and U.S. patent application Ser. No. 12/100,782, filed Apr. 10, 2008 and titled "ROBOTICS SYSTEMS," the entire contents of which are incorporated herein in their entirety by reference. For example, to avoid an obstacle, a control routine can cause the robot to travel in an outward spiral or to bounce and recoil from obstacles making random turns.

Figure 1:
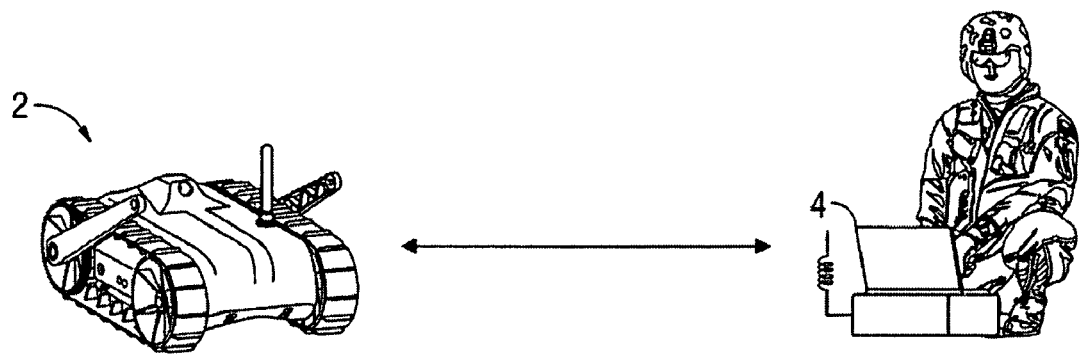
FIG. 1 illustrates a robot and remote control system.
Figure 2A:
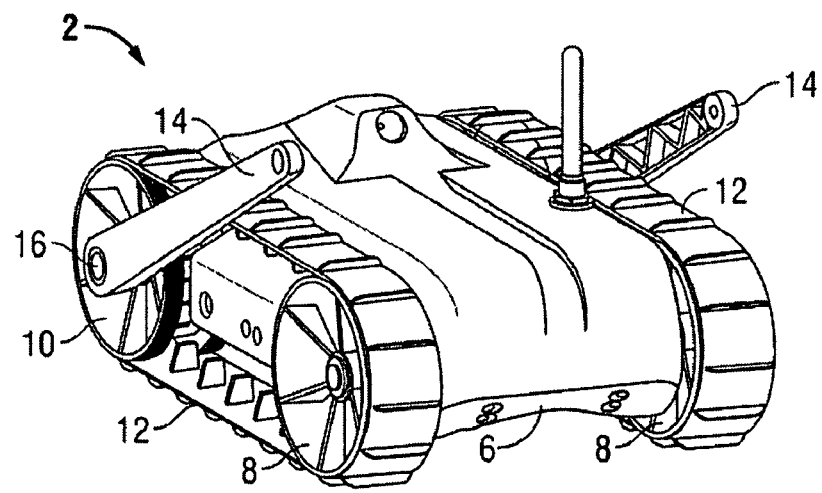
FIGS. 2*a-d* are perspective, front, side and top views of a robot having flippers.
Figure 2B:
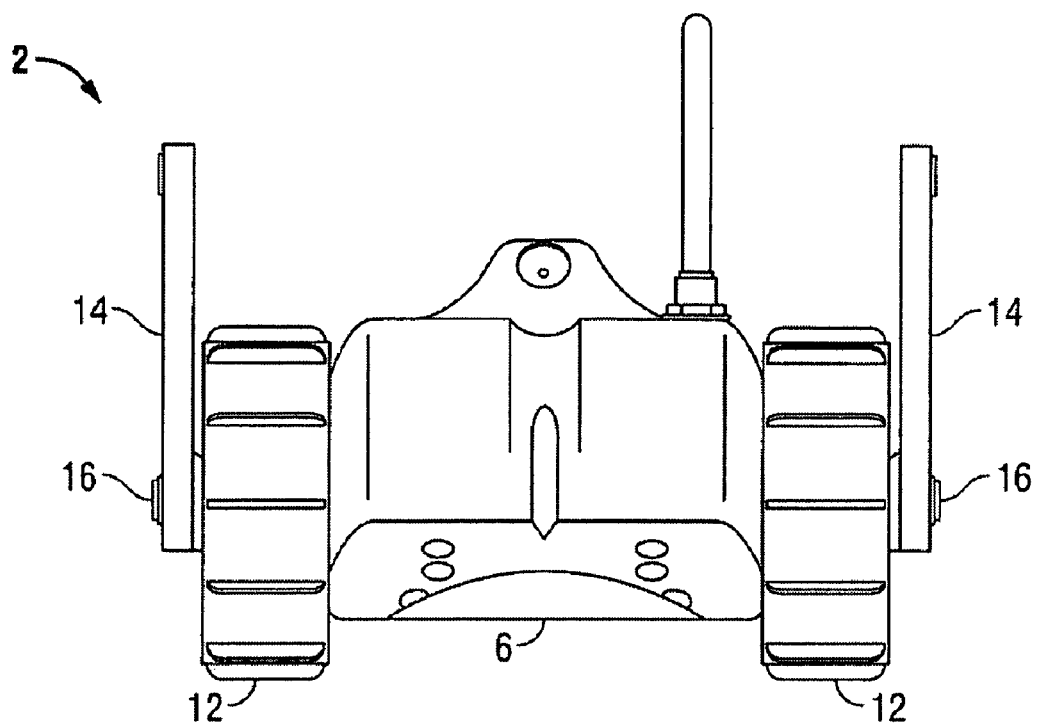
Figure 2C:
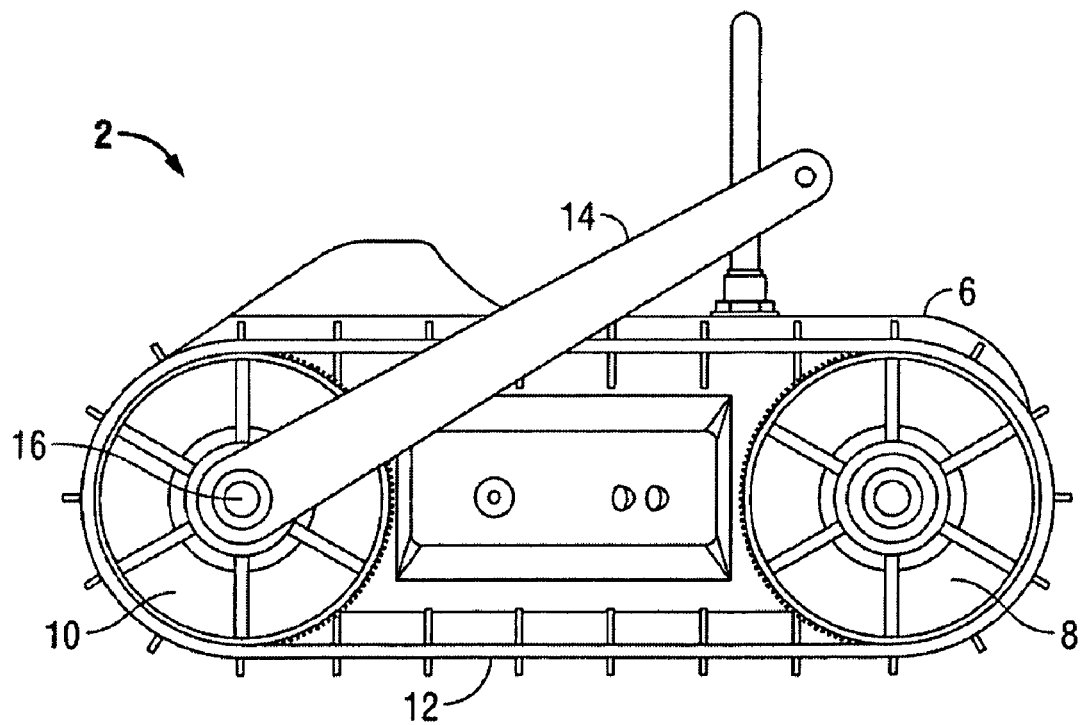
Figure 2D:
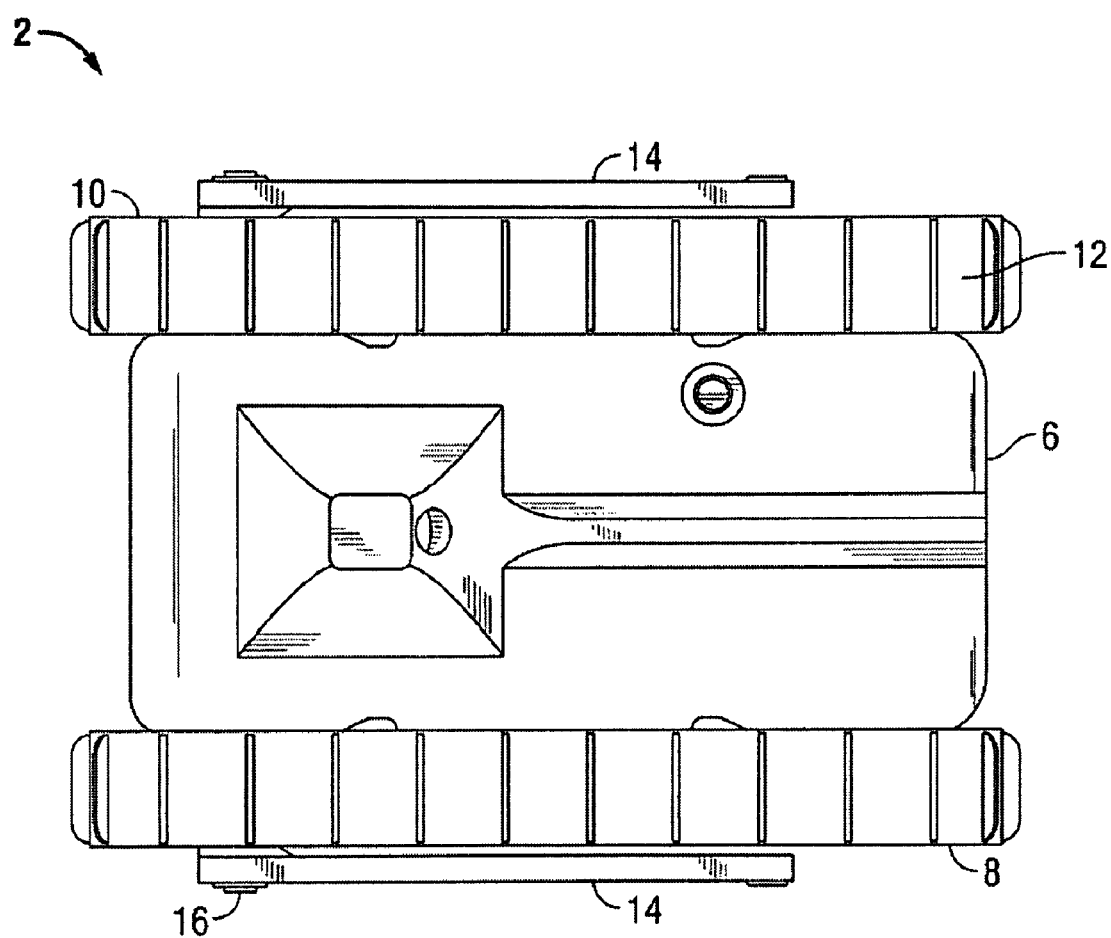

With reference to FIG. 1, a mobile robotic vehicle or robot 2 is operable via an Operator Control Unit (OCU) or remote control system 4. Remote communications can be transmitted via radio signal, infrared signal, wi-fi signal, cellular signal, or other suitable signal. In some circumstances, robot 2 can perform automated routines without remote use intervention. In other cases, a combination of automated routines and user controls are used to maneuver robot 2. Remote control system 4 can include any number of radio transceivers or other communications links and can interface with any number of robots or though any number of robots as mesh network nodes or other parts of a communications network.

This version of robot 2 is sized to be portable, and to substantially fit within a bounding volume approximately 18 cm (7 in.) long, 12 cm (5 inches) wide and 6 cm (2 inches) tall. The overall dimensions of a particular embodiment are about 16 cm×12 cm×6 cm excluding the antenna and camera protruding from the chassis, with a total mass of about 0.5 kg and a top speed of about 0.6 m/s over a smooth surface. In some embodiments, the vehicle is configured to fit in a combat uniform cargo pants pocket. Multiple robots 2 can be stacked to fit in a backpack. Compactness and portability allow robot 2 to be easily transported by an individual and to be deployed into an area by simply tossing the robot.

The robot is removed from a carrying compartment, is activated by pulling a grenade-style pull pin, and is then tossed down a corridor, up a stairwell or into a window. The platform can be thrown by a single person or launched into an upper window or rooftop using an improvised slingshot. Landing on a top floor, the remotely operated platform may be able to bypass some typical obstacles and travel down stairs. The operator can evaluate the resultant video before determining the next course of action. The robot can also be used to search for and assess booby traps, enemy personnel, and improvised explosive devices (IEDs).

In a particular embodiment, each of the robot 2 and remote controller 4 and weight less than eight pounds. In some cases the robot is between 0.5 and 1.0 Kg and the remote control 4 is a small PDA with a mass less than 0.5 kg. A separate charging station can be used for both the remote control 4 and robot 2.

Remote control system 4 allows an operator to control robot 2 from a distance. The operator can select different levels of human control over the robot, ranging from a teleoperation mode, in which the operator directly controls the motors and actuators on the robot, to autonomous operation, in which the operator passes higher-level command to the robot. In partially autonomous operation, robot 2 can perform tasks such as following a wall, avoiding an obstacle, surmounting an obstacle, avoiding a drop off or "cliff," avoiding becoming high centered, evading a moving object, positioning a transceiver, self-righting, repositioning to optimize communication network coverage, and the like.

Alternative versions of the remote control system 4 support teleoperation as well as a means of switching between teleoperation and autonomous control. The user can interrupt autonomous operation of the robot at any time to give commands and direction, and the robot can operate autonomously when not receiving particular directions from the user. The system provides predetermined warning signals to the operator, for instance if it is unable to operate autonomously, possibly by means of a vibrating unit that could be worn by the operator and which would be effective in a noisy environment. In addition, the user can add additional tasks to the robot's mission and request notification from the robot when milestone tasks have been achieved.

Versions of the robot can perform various autonomous tasks which can be initiated by the operator from remote control system 4. These include obstacle avoidance, wall following, climbing stairs, recovery from high centering, self-righting, returning "home," searching for a designated object, mapping, and establishing a communications network. The robot can use the various mobility modes described above in these autonomous operations, and if necessary, can call for operator assistance during its execution of a task. Alternative configurations of pivotal arms can be used. For example, a single central "arm" can be used.

With reference to FIGS. 2a-d, robot 2 includes a body portion or chassis 6 housing, inter alia, drive components, a power supply, control system and communication module. A pair of drive wheels 8 is positioned at a forward end of chassis 6 and a pair of idler wheels 10 is positioned at a rearward end of chassis 6. Wheels 8 and 10 can include spiral spokes to provide additional impact resistance.

A pair of resilient tracks 12 is trained about wheels 8 and 10 on opposing sides of chassis 6 extending from the sides of the chassis to provide a driven support surface for robot 2. Tracks 12 are continuous flexible belts with interior surface features for engaging drive wheels 8 and exterior surface features for gaining traction over various terrains.

First and second rotatable arms or flippers 14 extend radially from a common drive axle 16. In the illustrated embodiment, idle wheels 10 free spin about flipper drive axle 16. Flippers 14 are configured to extend through a 360 degree range of motion to allow robot 2 to perform various positioning, obstacle surmounting and self-righting maneuvers. In other embodiments, a single rotatable arm can accomplish these functions. In a particular embodiment, flippers 14 are made from a flame rated advanced formula polymer with 85D Shore hardness available from Quantum Cast, part number AFP3100FR, UL 94 FR and FAR 25.853. Through holes or other features can be provided on flippers 14 for attachment of flipper accessories, e.g., cameras, sensors, or wheels positioned at the flipper tip or along the flipper length. For example, a camera, antenna or sensor can be mounted on the end of the arm to provide better exposure or higher vantage point.

Flippers 14 can be rotated to any desired angle relative to chassis 6. Robot 2 is designed to move about in a variety of environments, including an urban environment of buildings (including staircases), streets, underground tunnels, as well as in vegetation, such as through grass and around trees. Robot 2 has a variety of features which provide robust operation in these environments, including impact resistance and tolerance of debris entertainment. Wheels 8 and 10 are positioned on chassis 6 to provide greater ground clearance when right side up, yet can provide sufficient clearance in some embodiments for operation when robot 2 is inverted. In the present embodiments, robot 2 preferably recovers from a tumble or fall in which it is inverted by a self-righting function.

Chassis 6 and other rigid robot components are designed for strength and low weight and are made from durable plastic, polymer, composites, 7075-T6 aluminum or other suitable lightweight, impact resistant materials. Tracks 12, wheels 8 and 10 and flippers 14 are also configured to be impact resistant. For example, wheels 8 and 10 can be a pliable material and can include spiraled spokes to provide a degree of resilience. Impact resistance is accomplished, in part, by surrounding much of the vehicle with compliant tracks 12 with pliable cleats. Tracks 12 and cleats provide a first layer of impact protection.

Tracks 12 are configured to provide skid steering and include compliant belts made of polyurethane or a similar flexible material. The belts are abrasion resistant and have high strength and minimal stretch due to internal steel or fiber cording. Tracks 12 define a left-right alternating tread to smooth successive impacts on most surfaces with a spacing between successive edges on the sides to catch larger terrain features for traction. Without a bogey rail, the robot tends to tread on the portion of the tracks at wheels' bottom dead center.

Tracks 12 can be stretched over wheels 8 and 10 and driven primarily by friction. The surfaces of wheels 8 and 10 contacting tracks 12 can be provided with a fine knurl pattern to enhance friction with tracks 12 and prevent slippage from formation of water films between wheels 8 and 10 and tracks 12. Alternatively, tacks 12 and drive wheels 8 can be formed with complementary features to provide positive drive engagement. For example, wheels 8 and 10 can have V-shaped grooves around their circumference to receive an integral V-shaped rib on the inside of track 12.

Alternative embodiments of the robot can use other types of tracks, such as tracks made up of discrete elements. However, debris may be caught between elements and such tracks are generally heavier than flexible belts. Other flexible materials can also be used for continuous belt tracks. Tracks 12 can include cleats, ridges, or other projections for additional traction. Such cleats can be angled to divert debris away from chassis 6.

Flippers 14 can be can be continuously rotated around axle 16. Flippers 14 can be rotated to a forward "stowed" position next to chassis 6. Alternatively, flippers 14 can be rotated to a rearward trailing position to prevent catching of the ends of flippers 14 on terrain, for example in tall grass. In some embodiments, to prevent possible damage, flippers 14 can automatically return to a stowed position when robot 2 detects that it is in free fall.

Figure 3A:
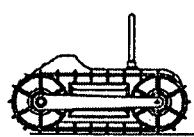
FIGS. 3*a-p* are side views of a sequence of stair surmounting maneuvers.
Figure 3B:
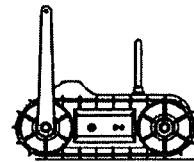
Figure 3C:
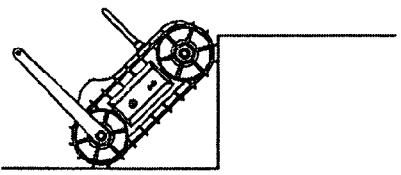
Figure 3D:
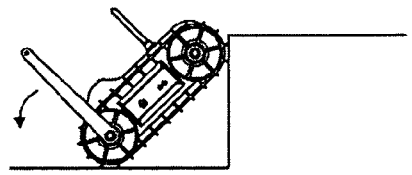
Figure 3E:
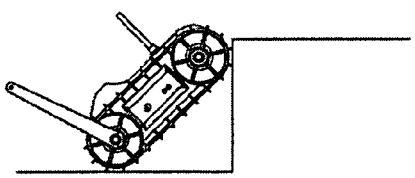
Figure 3F:
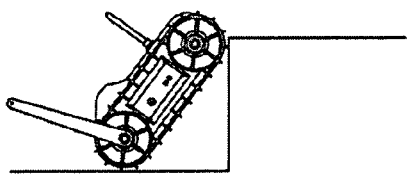
Figure 3G:
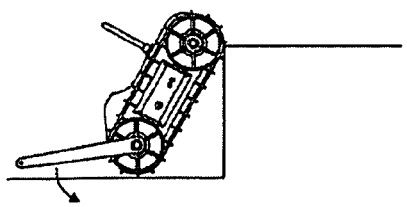
Figure 3H:
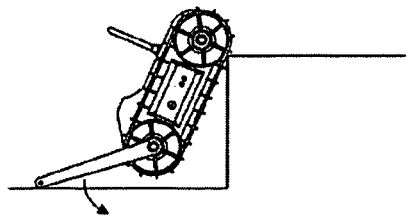
Figure 3I:
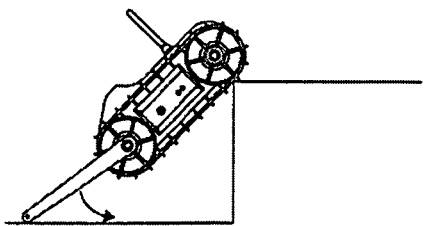
Figure 3J:
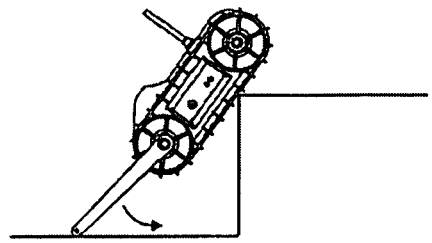
Figure 3K:
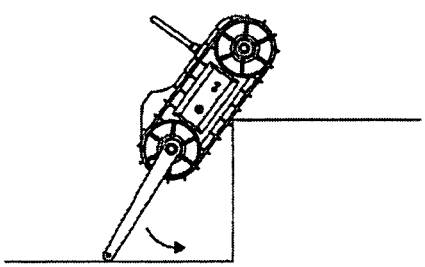
Figure 3L:
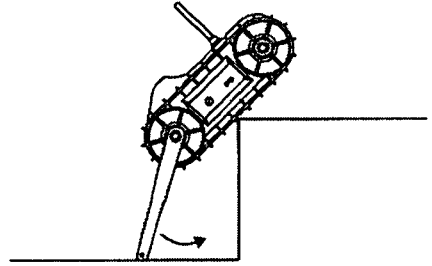
Figure 3M:
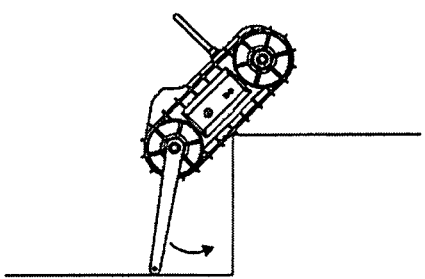
Figure 3N:
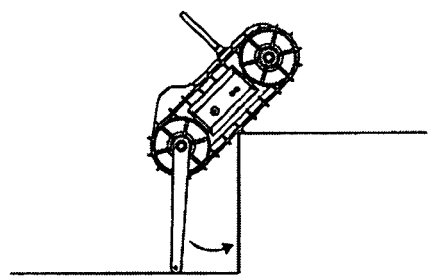
Figure 3O:
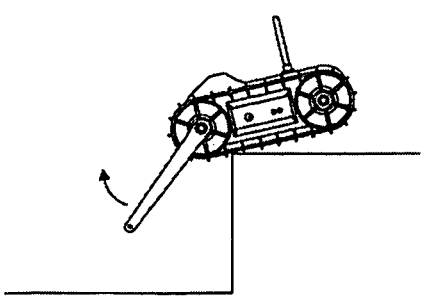
Figure 3P:
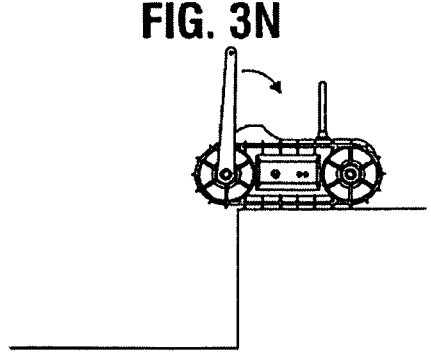
Figure 4:
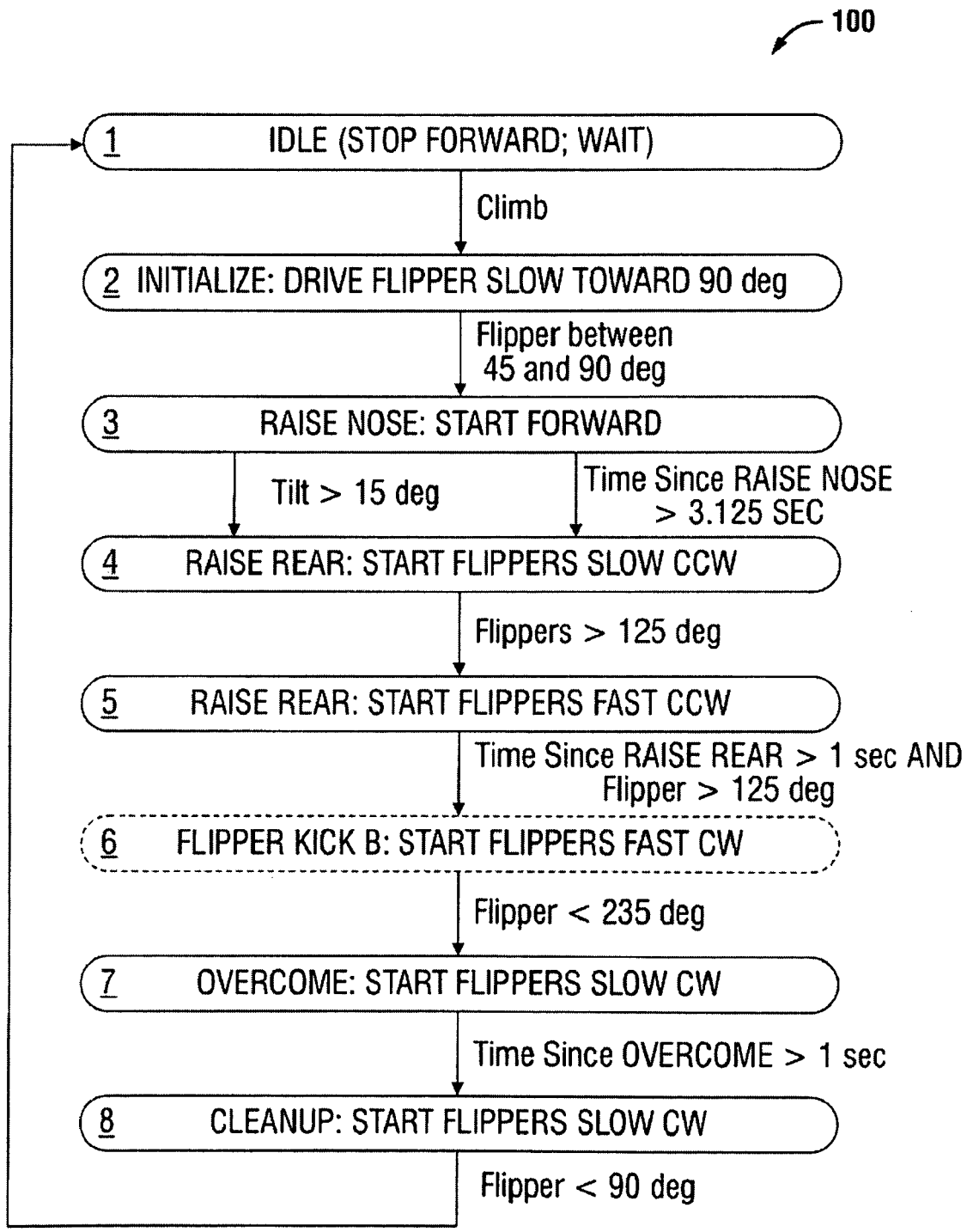
FIG. 4 is flowchart of an obstacle surmounting control routine.

With reference to FIGS. 3a-p and FIG. 4, flippers 14 are further configured to be driven to rotate at predetermined intervals in stair or obstacle surmounting maneuvers. Flipper positioning angles are stated with reference to the horizontal axis of chassis 6 as shown in FIG. 4 with 0 degrees being the stowed flipper position, 90 degrees being a vertical position, 180 being a trailing position and 270 being a downward position. An obstacle surmounting control routine is initiated by detection of an obstacle or predetermined scenario or by operator input. In state 1 of the routine, shown in FIG. 3A, robot 2 approaches a stair with flippers 14 is a forward stowed position substantially parallel to the ground at 0 degrees.

During obstacle surmounting maneuvers, a main obstacle surmounting control routine 100 is run on a controller at 64 MHz while sampling accelerometer data at 16 Hz and updating the flipper position at 16 Hz. Upon detection of the stair or other obstacle, the control routine enters state 2, in which flippers 14 are rotated upward and rearward between approximately 45 and 90 degrees, as shown if FIG. 3B. In state 3 shown in FIG. 3C, the forward end of robot 2 begins to ascend the front face or riser of a stair. Once the robot has ascended to a predetermined position shown in FIG. 3C as detected by an accelerometer, e.g., between about 15 and 45 degrees or a sensor reading of about 0.75 g, the routine enters state 4. Passage of a predetermined time since entering state 3, e.g., 3 seconds, can also trigger the fourth state.

In the fourth state, flippers 14 are rotated further counterclockwise or rearward between the positions shown in FIGS. 3D-3G, e.g., between about 90-125 degrees, as tracks 12 are further driven such that the forward end continues to ascends the stair riser and rearward end of robot 2 approaches the stair riser. After a predetermined time, e.g., 1 second, and as robot 2 approaches a substantially vertically position shown in FIG. 3G, flippers 14 contact the underlying surface at approximately 125 degrees and the routine enters a fifth state.

In the fifth state, flippers 14 are rotated quickly counterclockwise to lift the rearward end of robot 2 through the range shown in FIGS. 3G-M, e.g., between about 125 and 275 degrees, while tracks 12 are driven until the center of gravity of robot 2 clears the nose of the stair as shown in FIG. 3N. Flippers 14 further serve to resist back sliding or any wheelie tendency as robot 2 clears the stair nose.

In an optional sixth state, if flippers reach about 275 degrees and the accelerometer has not detected that the center of gravity of the robot has cleared the nose of the stair, flippers 14 are kicked backward from about 275 degrees, e.g., to less than about 235 degrees, in an effort to topple robot 2 forward from a possible teetering position.

Once the accelerometer detects that the center of gravity of robot 2 has cleared the nose of the stair, the routine enters a seventh state. In state 7, robot 2 overcomes the stair and tips forward as the center of gravity clears the stair nose as shown in FIG. 3M. Upon entering state 7, or after a short time delay, e.g., 1 second, flippers 14 are rotated clockwise towards a trailing position as shown in FIG. 3O. This prevents flippers 4 from catching on the surmounted obstacle as the robot is driven forward.

Once the accelerometer detects that the robot has settled atop the stair or after a predetermined period of state 7, e.g., 1 second, an eighth routine state causes flippers 14 to return to a default position, e.g., substantially vertical, to prepare to surmount a second stair. Flipper position is determined in the different states using a flipper position sensor.

States 1-8 and the various maneuvers shown in FIGS. 3B-P are then repeated as needed to surmount successive stairs or other obstacles.

Another obstacle surmounting routine 200 is described with reference to FIGS. 5A-R and FIG. 6. When the front wheels encounter a vertical stair riser, there may not be sufficient ground friction to allow the wheel/tracks to climb the riser. This is particularly true in dusty or sandy environments where the floor friction can be substantially less than that of the cleaner stair riser. To assist the front wheels in initiating climbing, flippers 14 are used to initially raise the forward end of the robot 2. This can also be particularly helpful if a stair riser is angled outward.

Figure 5C:
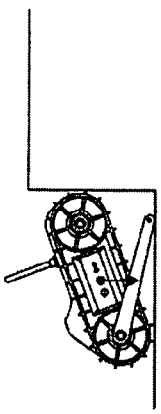
FIGS. 5*a-r* are side views of another sequence of stair surmounting maneuvers
Figure 5F:
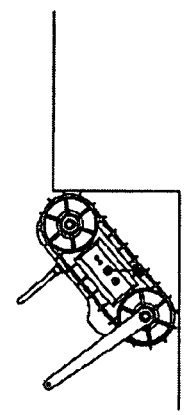
Figure 5I:
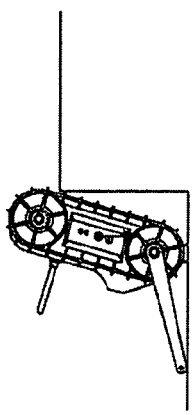
Figure 5B:
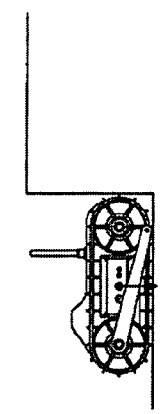
Figure 5E:
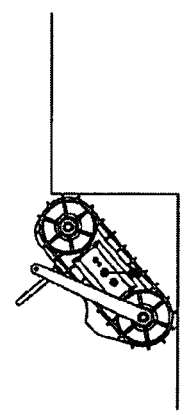
Figure 5H:
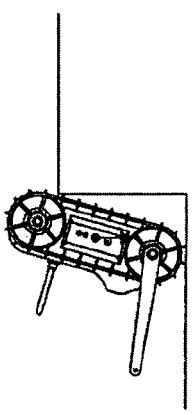
Figure 5A:
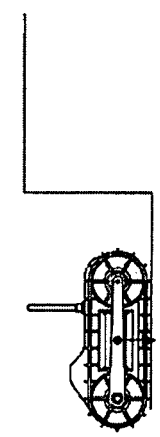
Figure 6:
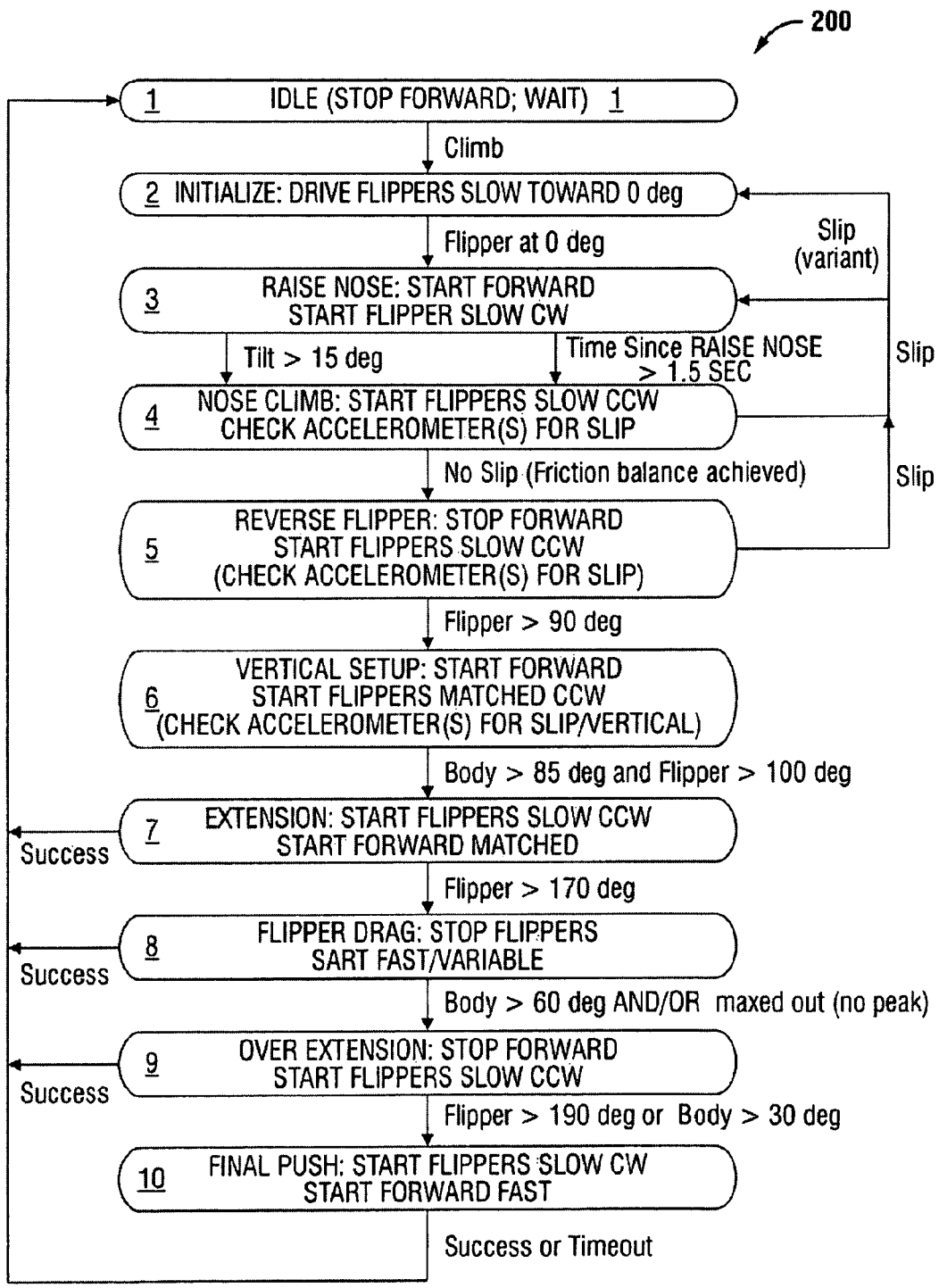
FIG. 6 is flowchart of another obstacle surmounting control routine.

In state 1, the robot advances forward towards the stair riser as shown in FIG. 5A. Tracks 12 are driven forward until the robot reaches the riser.

In state 2, flippers 14 are rotated to the stowed position, e.g., 0 degrees in preparation for lifting the nose of the robot.

In state 3, flippers 14 are rotated "clockwise" downward such that the distal ends of flippers 14 contact the underlying surface forward of the center of gravity of robot 2 as shown in FIG. 5B. Tracks 12 are advanced to ascend the stair riser.

In state 4, continued clockwise rotation of flippers 14 causes the forward end of robot 2 to raise up off the underlying surface at to a predetermined angle, e.g., about 15-45 degrees, as shown in FIG. 5C. If the angle is not reached within a preset time, e.g., 1.5 seconds, the routine advances to the next state.

The predetermined angle is selected to approximate the angle at which the frictional forces between the tracks and the floor and the tracks and the stair riser are sufficiently balanced to prevent back-sliding of the robot. Balance of the frictional forces between the track the riser and underlying surface enables the track to ascend the riser without continued clockwise rotation of flippers 14. The routine can periodically test to see if the friction balance point has been achieved by slightly lifting the flippers and using the accelerometers to detect backsliding. Once it is determined that the balance point has been reached or passed, the flipper is no longer needed to raise the forward end of the robot. If the accelerometer detects slippage or backsliding of the robot, previous states can be repeated as needed. In some embodiments, the track velocity is coordinated with the flipper motions to help maintain traction and frictional balance.

In state 5, flippers 14 are rotated clockwise to an "upwards" position as shown in FIGS. 5E-F, e.g., to 90 degrees, to prevent the robot from flipping over backwards as the wheels continue to climb. This movement is preferably performed without substantially shifting the center of gravity or introducing disturbances that would upset the frictional balance.

Figure 5D:
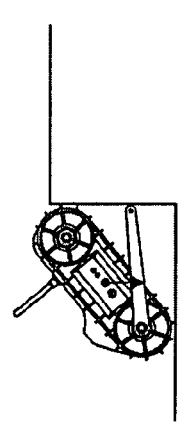
Figure 5G:
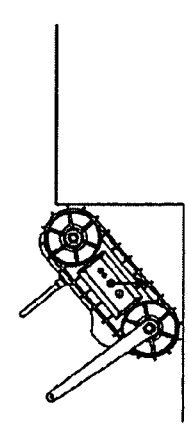
Figure 5J:
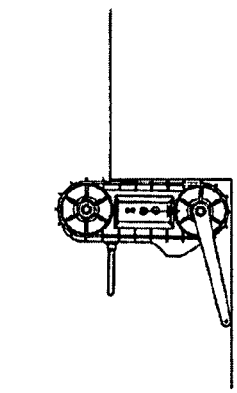
Figure 5K:
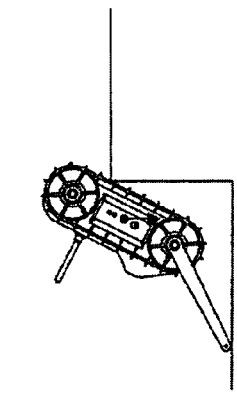
Figure 5L:
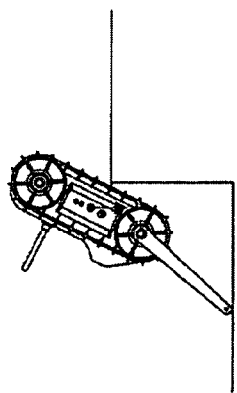
Figure 5M:
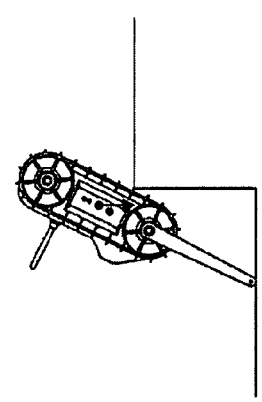

It is advantageous for flippers 14 to be long enough to extend forward of the center of gravity, yet short enough to not get caught under a stair nose when later rotating counterclockwise, as shown in FIGS. 5D-E to prepare to raise the rearward end of the robot. An estimated maximum flipper length is calculated by adding the wheel radius to the product of the length of the robot chassis and cosine of the angle at which the frictional forces are sufficiently balanced to enable continued climbing by the tracks. This flipper length provides sufficient clearance for retraction of the flippers from a forward to a rearward position after partial ascend of a stair rise by the robot. Of course, flipper length can be dictated by anticipated obstacle profiles including more aggressive forward riser angles.

In state 6, tracks 12 are advanced to position the chassis substantially vertically against the stair riser with flippers rotated counterclockwise to a point adjacent to or contacting the ground as shown in FIGS. 5G-J.

In state 7, flippers 14 are extended, e.g., from about 100 degrees to 175 degrees, while tracks 12 are driven at a "matched" velocity as shown in FIGS. 5J-O, or slightly faster as dictated by the geometry of the problem, to allow the track to evenly surmount the stair nose as the robot is pushed upward by flippers 14. Matching of the track velocity to the flipper rotation means that the tracks are advancing a distance equal to the amount of extension provided by rotation of flippers 14. Velocity matching can also be used to maintain an angle of incline of chassis 6 as the robot surmounts the stair nose.

Figure 5N:
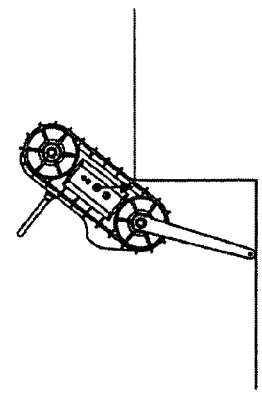
Figure 5O:
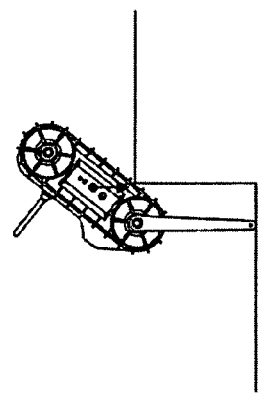

In state 8, tracks 12 are driven while flippers 14 simply drag behind to prevent backsliding or wheelies as shown in FIG. 5N. Flippers 14 are paused momentarily at the point of maximum extension, e.g., when the flipper tip is farthest away from the track/step corner, while the tracks continue to be driven forward. As the track cleats bounce over the stair nose, the flipper tips will bounce and drag along the ground closer to the step wall. The track speed can be varied to achieve a desire bouncing pattern.

In state 9, flippers 14 are again rotated counterclockwise to provide an extra extension to slightly level out the robot. This "over extension" of the flippers can also help tip the robot center of gravity over the stair nose.

Figure 5P:
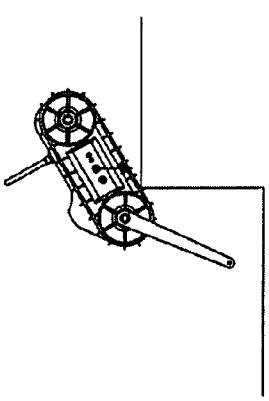
Figure 5Q:
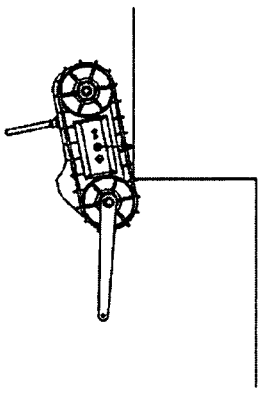
Figure 5R:
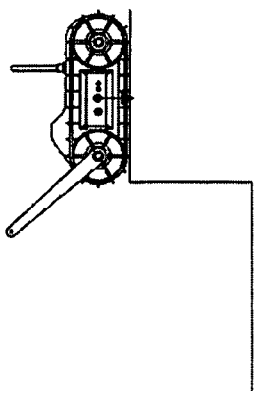

In state 10, tracks 12 are driven quickly while flippers 14 are slowly rotated clockwise back to the full extension point to climb onto the top of the step as shown in FIGS. 5P-R. In this position, the flippers can catch the robot should it happen to back slide or tumble backwards. Once the center of mass of the robot extends forward of the stair nose, the robot falls forward on top of the step.

Once the vehicle tips forward of the step nose (as indicated by the accelerometers showing the tilt angle going back to level) flippers 14 are restored to a default driving or stowed position.

In another control routine, flippers 14 can be continuously rotated to overcome a high centered position. A high centered position can be detected in multiple ways. For example, monitoring of video data, monitoring accelerometer data, comparing odometer and navigational data, GPS data discrepancies. Track motions can be coordinated with flipper motions to pull the vehicle forward, e.g., by driving the tracks when the flipper is in contact with the surface at the same rate that the flipper is expected to pull the vehicle forward. Flipper rotation rates can depend on the expected or detected terrain, e.g., whether the flipper tips will penetrate the terrain surface. The effective flipper radius can be dynamically determined by signal processing the accelerometer signals after repeated rotations of the flipper as a function of flipper tip penetration into the underlying surface. To prevent "digging in," the tracks can be driven when the flippers are in contact with the underlying surface. The flipper rotational rate can be selected as a function of surface penetration and movement of the robot over the terrain and baseline data for behavior of the robot driving over different terrains.

In the depicted embodiment, the flippers extended substantially the distance between the drive wheel axle and the idler wheel axle. In some cases, the flipper length is selected to fit entirely within the length of the chassis and to extend forward of the robot center of gravity. In some cases the flippers are at least as long as the idler wheel radius. The flippers or flipper length can be selected based on the dimensions of anticipated obstacles.

Figure 7:
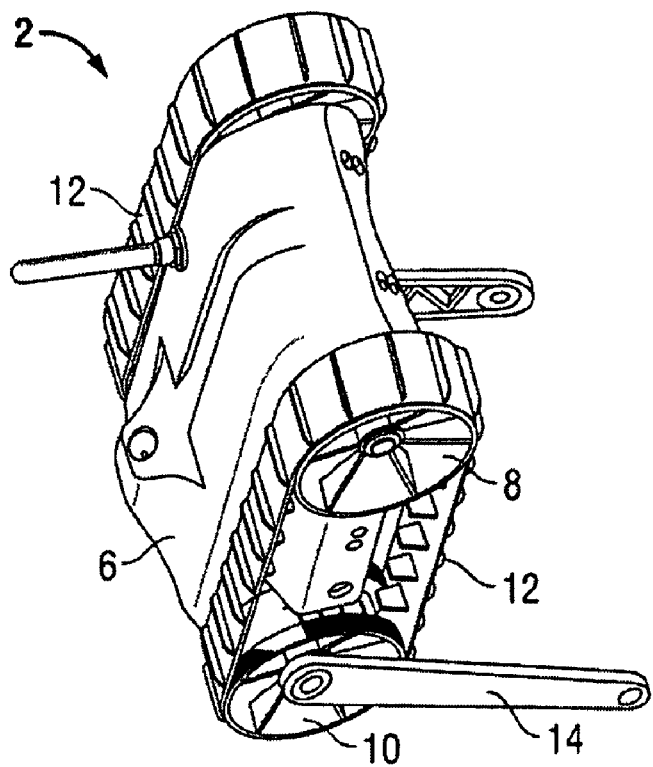
FIG. 7 is a perspective view of a robot in an elevated position during a self-righting maneuver.

With reference to FIG. 7, flippers 14 are configured to extend from axle 16 centrally to a point beyond the center of gravity of robot 2. This allows robot 2 to be inverted or self-righted simply by rotation of flipper 14 through an arc of 90 degree beyond contact with an underlying surface.

Rotation past a vertical stability point causes the robot to fall over completing the inversion. Self-righting is often required after tumbling down stairs or other inclines, or from atop other obstacles. Robot 2 can descend stairs forwards or backwards with flippers 14 in a stowed position, driving tracks 12 either direction and tumbling or rolling to a resting position.

In some embodiments, robot 2 has more ground clearance in one orientation than another. In some cases, a camera, antenna, sensor or robot accessory may need to be reoriented upward if robot 2 lands upside down after a descent from an obstacle.

Figure 8:
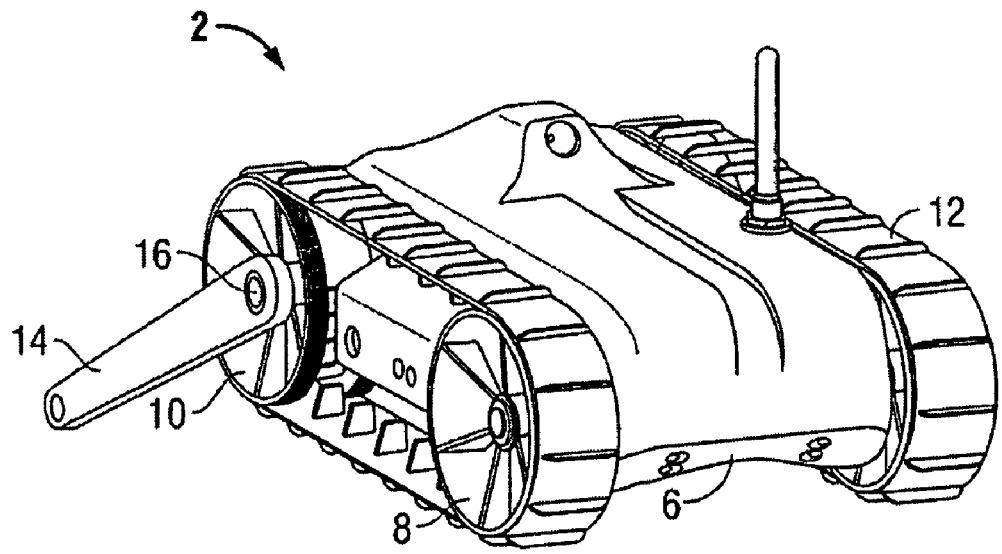
FIG. 8 is a perspective view of a robot in a partially elevated position.

With reference to FIG. 8, flippers 14 can also be rotated to partially elevate the rearward end of robot 2. In some cases, flippers 14 can be used to raise or upend robot 2 to position a camera, antenna, sensor, munitions or the like at a desired height or angle or for helping to pull robot 2 from a high centered position.

Flippers 14 can be repeatedly or continuously rotated in either direction to provide a "swimming" motion to help propel robot 2 through loose debris, gravel, sand and the like. Flippers 14 can raise the nose of the vehicle, to both help start a climb and to elevate a fixed camera.

Figure 9:
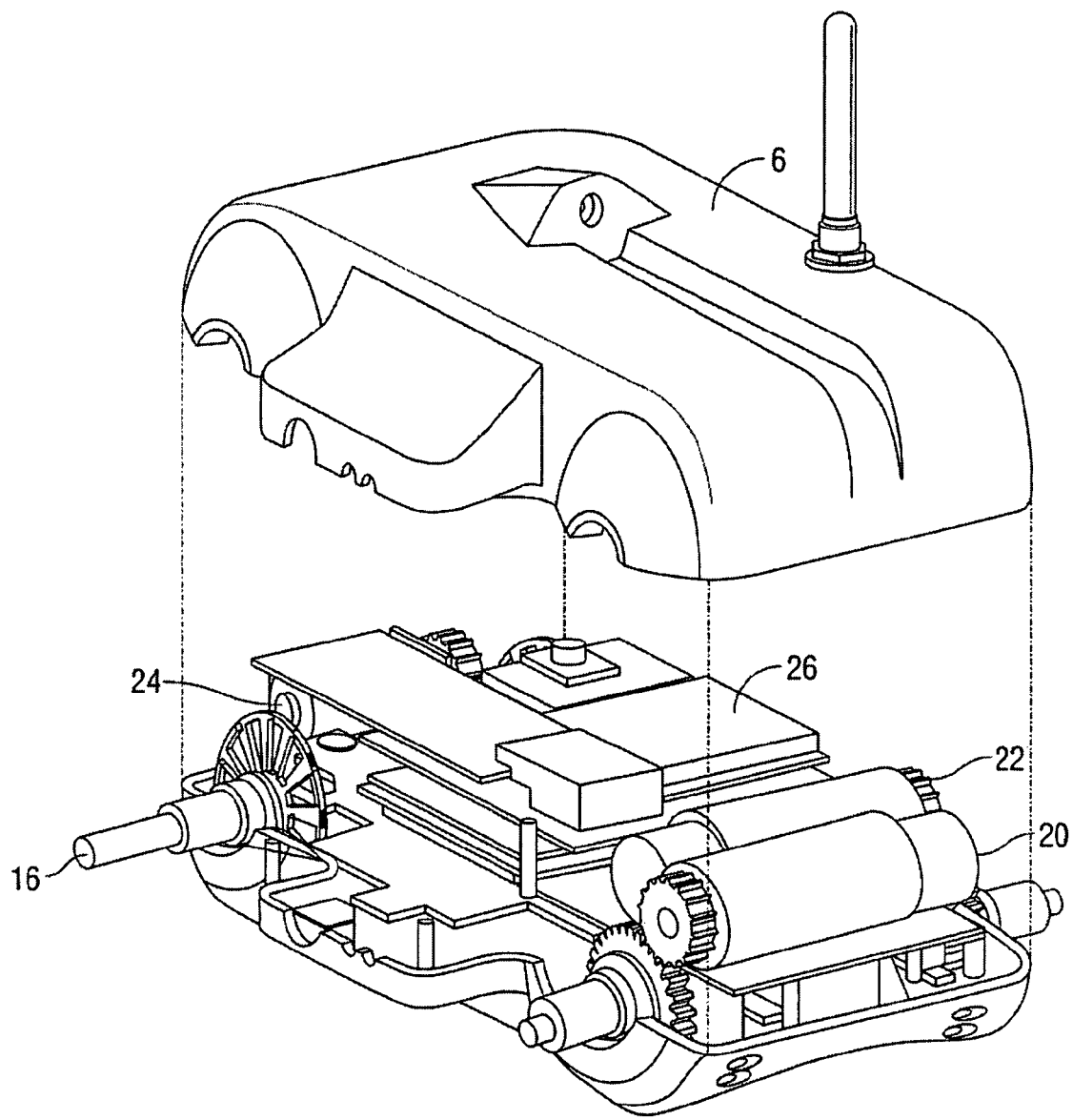
FIG. 9 is a partially exploded view of a robot chassis.

With reference to FIG. 9 robot chassis 6 houses, inter alia, wheel drive motors 20 and 22 for powering drive wheels 8 and a flapper drive motor 24. Chassis 6 also houses an electrical subassembly 26 and battery (not shown) positioned below electrical subassembly. The battery is a significant portion of the total weight of robot 2 and is positioned substantially centrally front to back and towards the bottom of chassis 6. A clamshell chassis body design allows provides sufficient volume for electronics and mechanical drive mechanisms within a protective cover.

Flipper drive motor 24 is used to control the angle between flappers 14 and chassis 6. Flipper drive motor 24 is coupled via a gear reduction train to axle 16. A slip clutch can be used to transfer output torque from flipper drive motor 24 to axle 16. A slip clutch can be adjustable to set a predetermined slip torque. Flippers 14 are connected via solid axle 16 and an optic sensor on axle 16 provides for detection of the position of flippers 14 regardless of clutch slippage. One clutch embodiment includes two beveled gears engaged with a spring, similar to a cordless drill clutch. Axle 16 passes through a central opening in idler wheels 10 and fixedly connects to flippers 14.

At the rear of the robot are two flippers 14 with the ability to rotate 360° continuously to flip the robot over when inverted. The flippers also assist the robot in climbing and negotiating small obstacles. Also integrated into the flipper mechanism is a slip clutch to protect the gearing in case of impact.

Drive motors 20, and 22 are 1 watt DC brushed motors. In other versions of the robot, brushless motors can be used. Drive motors 20 and 22 turn output drive gears that attach to the wheels via integral splines. Output drive gears are retained via brass or Delrin bushings that register and align complementary portions of the chassis body. Drive motors 20 and 24 are geared down 29:1 to drive wheels 8.

Steering is accomplished using differential speed of the tracks 14 on either side of the robot by varying the speed of drive motors 20 and 22. The robot will, in principle, skid around the center of chassis 6 approximately at the midpoint of the length of tracks allowing complete turning with the extremes of the robot staying within a 23 cm (9") diameter circle.

In some cases, tracks 14 can be driven while flippers 14 maintain an end of robot 2 elevated above an underlying surface, for example to reposition an elevated antenna or camera. Other preprogrammed flipper or robot positions can include fully extended, stowed, inclined, upright, and "wheelie." In addition, robot 2 can perform several maneuvers including self righting, stair climbing, and recovery from high centering.

The chassis body can further serve to retain bushings for moving parts and as a mounting surface for an antenna, camera, microphone, sensors and the like. Dust and moisture seals can be provided where axles or other components pass through the chassis body. For example, brass bushing securing at openings around chassis body 6 serve to support axle 16 and the idler wheel axles. Chassis body 6 can also carry an antenna connector base (e.g., standard SMA antenna connector).

Figure 10:
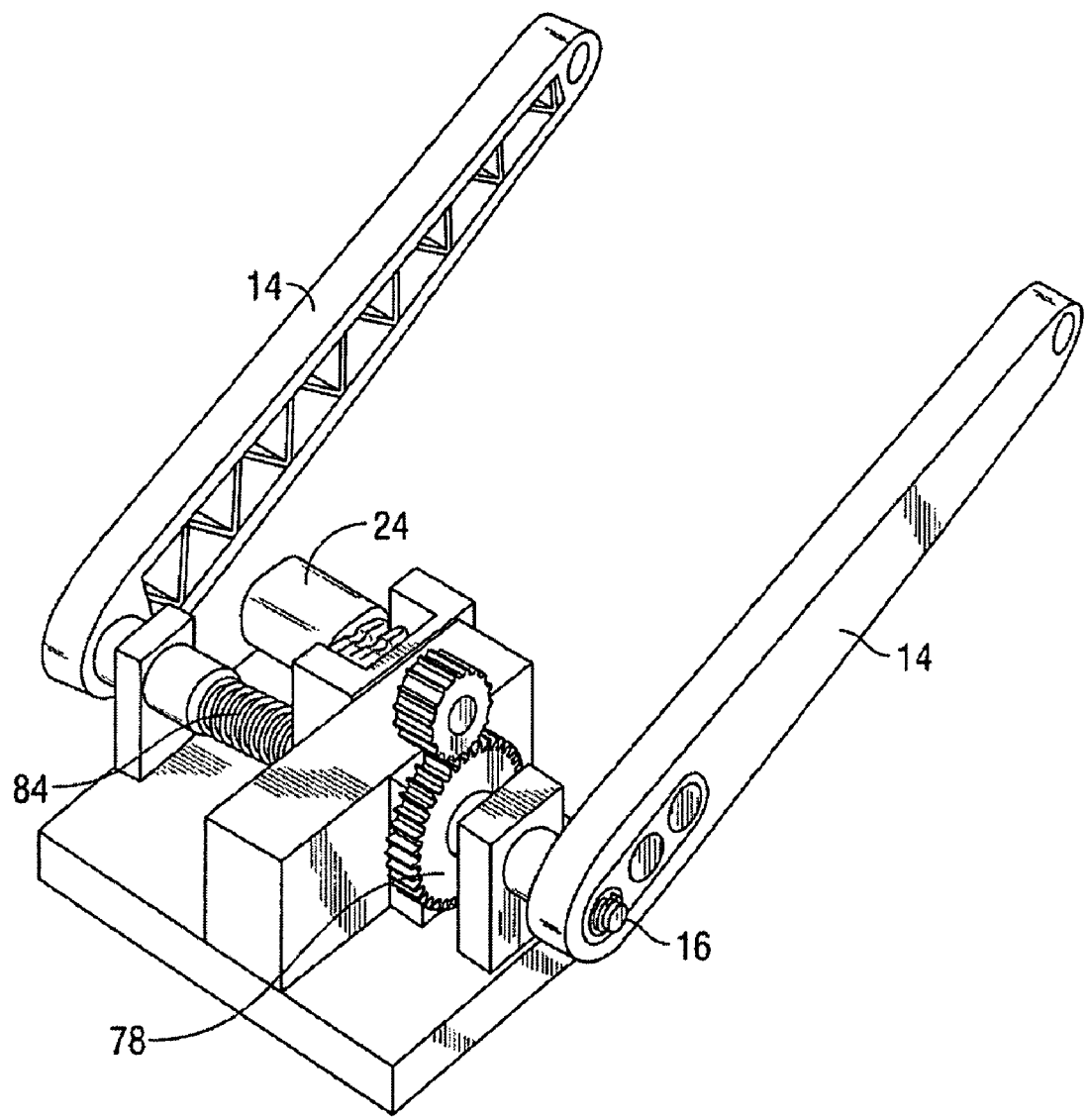
FIG. 10 is a perspective view of a flipper drive system.

With reference to FIG. 10, flippers 14 are rotated by drive motor 24 (0.4 watt DC brushed motor) via gear train 26. Flipper drive motor 24 is geared down 298:1 to axle 16 to provide a torque of approximately 400 mNm (~2× required to lift vehicle weight). Clutch can be adjusted to provide up to 700 mNm of slip torque. A slip clutch prevents overloading of flipper drive motor 24 and gearing, for example due to an impact on the arms.

Flippers 14 can be stowed parallel to chassis 6 and tracks 12 when it is deployed by tossing or dropping it through a window or door or when the robot tumbles. In some embodiments, a mechanical energy storage provides for sudden release to move the flippers to allow the robot to perform a small leap motion. An example energy storage system can be a spring, flywheel or other mechanical energy storage mechanism.

Figure 11:
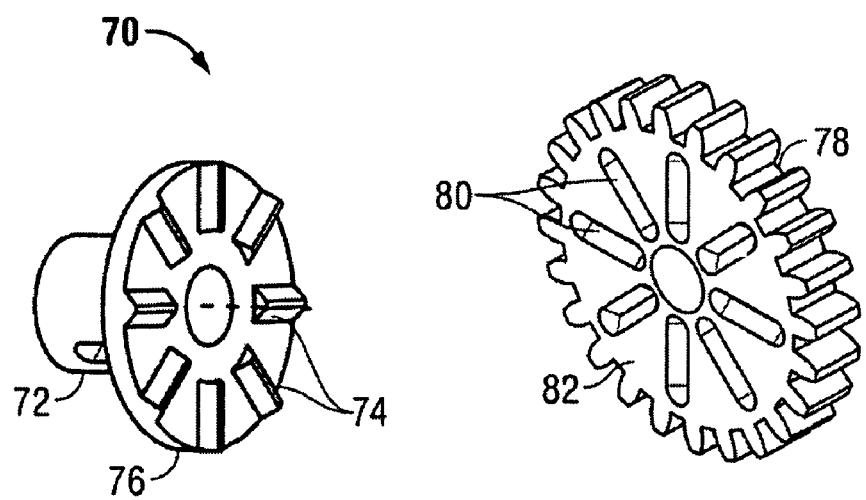
FIG. 11 is a perspective view of opposing sprockets of a slip clutch.
Figure 12:
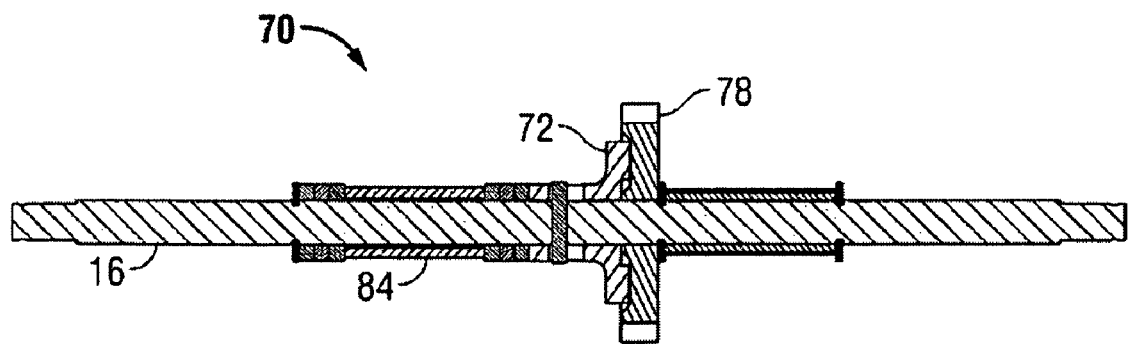
FIG. 12 is a cross-sectional view of the opposing sprockets of the slip clutch assembled on a drive axle.

With reference to FIGS. 11 and 12, a slip clutch 70 is provided on axle 16 between drive motor 24 and flippers 14. Slip clutch 70 includes a first sprocket 72 carrying a series of drive teeth 74 on a first rotary surface 76. First sprocket 72 is fixedly attached to axle 16. A second sprocket 78 defines a series of slots 80 in a second rotary surface 82 for receiving the drive teeth 74 of first sprocket 72. Drive teeth 74 and slots 80 remain engaged so long as first and second rotary surfaces 76 and 82 remain substantially in contact.

Under sufficient toque, the tapered surfaces of teeth 74 cam rotary surfaces 76 and 82 apart allowing teeth 74 to slip one or more slots. Sprockets 72 and 78 are biased towards engagement via a spring 84 retained on axle 16. Spring 84 provides an axial force to slip clutch 70 to resist separation of surfaces 76 and 82. First sprocket 72 is connected to axle 16 while second sprocket 78 spins freely about axle 16 when disengaged from sprocket 72. Second sprocket 78 includes gear teeth about its circumference to engage drive motor 24.

During obstacle surmounting maneuvers, drive motor 24 turns second sprocket 78 which in turn rotates first sprocket 72 and axle 16 to rotate flippers 14.

Alternatively, a slip clutch can be formed of sufficiently pliable material to allow flexure of rotary surfaces 76 and 82 under sufficient torque. Any number of frictional or cammed surfaces or other known types of slip clutches can be substituted for slip clutch 70.

Figure 13:
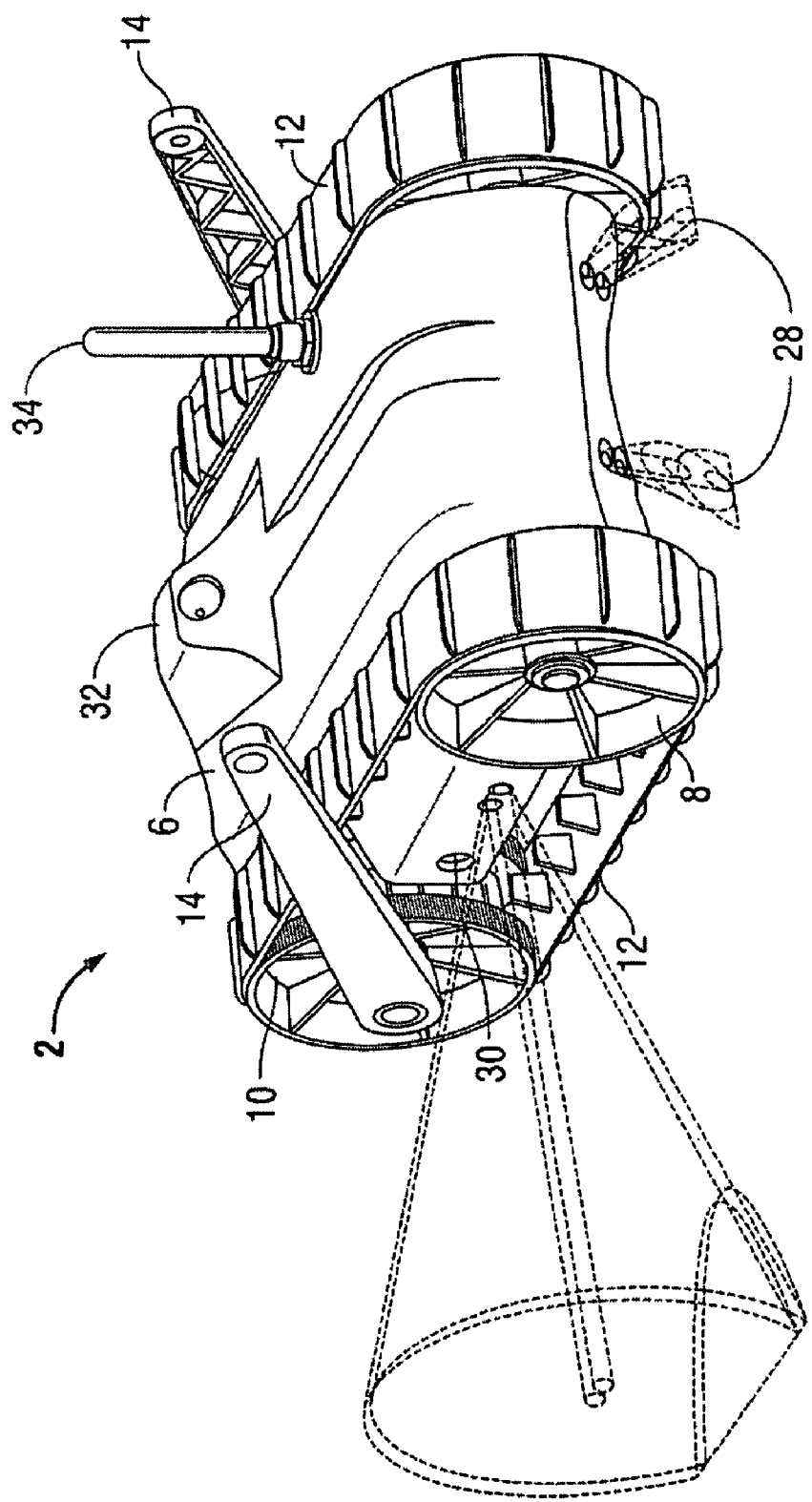
FIG. 13 is a perspective view of a robot including sensor zones

With reference to FIG. 13, robot 2 is provided with a pair of end sensors 28 and side sensors 30. Sensors 28 can be positioned on one or both ends of robot 2 and sensors 30 can be positioned on one or more sides of robot 2. Sensors 28 and 30 include IR emitter/detector pairs. Sensors 28 are directed substantially parallel in front of tracks 12 to act as cliff detectors to detect and avoid falls and sensors 30 are directed outward from chassis 6 to act as wall detectors. Sensors 28 and 30 can include filtering features to accommodate ambient sunlight. Sensors 28 and 30 provide feedback that is used by robot 2, for example, to follow a wall or avoid a drop off. Sensors 28 and 30 can include sonar, infra red, proximity, impact or other sensor suitable to detect the presence or absence of an object in the sensor range. Additional sensor based autonomous robot behavior routines are disclosed in U.S. Pat. No. 6,883,201, titled "ROBOT OBSTACLE DETECTION SYSTEM" which is incorporated herein by reference in its entirety.

Additional autonomous behavior routines and control systems are disclosed in U.S. Pat. No. 6,809,490 titled "METHOD AND SYSTEM FOR MULTI-MODE COVERAGE FOR AN AUTONOMOUS ROBOT" and U.S. Pat. No. 7,459,871 titled "DEBRIS SENSOR FOR CLEANING APPARATUS," which are incorporated herein by reference in their entirety. The routines include motion control and coverage behaviors such as spiral coverage, cruising, bounce and recoil from an obstacle, wall following, self-alignment, and escape behaviors as selected by an arbiter according to principles of behavior based robotics. Additional reactive controls and behavior routines are provided for reacting to and concentrating on a point of interest in the coverage space. Similar behaviors can be used to seek out a peak signal strength peak or radio hot spots or to reposition a robot as a node in a mesh network.

Sensors can be shielded within the track volume, within the protective shell of chassis 6 or positioned on the front and rearward ends of the vehicle. The top and bottom portions of chassis 6 can be fitted with any number of sensors, cameras, antennae, chemical sensors, bio-sensors, radiation sensors and the like.

Additional robot sensors provide input regarding flipper rotation position, connector to a charging station, presence of a deactivation plug (pull pin). For example, robot 2 can be powered off if sensors detect that drive motors 20 or 22 have stalled of if the robot is otherwise stuck.

Chassis 6 also supports a camera 32 and antenna 34 to provide video telemetry and other communications data. Camera 32 is depicted positioned slightly rear of center, with the lens angled up to minimize the field of view obstructed by the robot vehicle itself. Flippers 14 can be rotated to raise the nose of the vehicle further if the camera view is insufficiently high. To look over an edge, flippers 14 can be used to raise the rear of the vehicle to depress the camera view angle.

Transmission of video telemetry data or other sensor data from within a building can enable a small force to quickly and safely assess a location or situation. For example, a camera can be used to quickly and safely determine the presence and location of an adversary or explosive in a building Robot 2 includes the capability of carrying a variety of accessories or sensors, including cameras, sonar sensors, infra-red detectors, inertial sensors, motor position, velocity and torque sensors, inclinometers, a magnetic compass, microphones, sound generator, or small weapon. Sensors can be placed on all surfaces of the robot. For example, night time or low light operation can be performed using onboard light such as an infra-red (IR) array with a useful range of several meters. A small white light can also be provided for up close color identification of objects.

A multi camera array can provide stereoscopic vision for navigation and video transmission back to remote control system 4. For example, multiple cell phone style cameras, each with multi-megapixel accuracy and a 90° field of view, to provide full 360° field of view. The robot can be configured to monitor for motion and alert the operator if motion is detected. Similarly, an onboard microphone can enable an alert to be sent to the operator if sound above a designated threshold is detected.

Onboard computing coupled with a multi megapixel imager can provide high resolution image capture and digital pan tilt zoom of the digitally compressed and encrypted video stream. This minimizes the mechanical complexity of the system by eliminating the need for a mechanical pan-tilt assembly, and allows the use of image processing for unattended operation such as change detection and digital video recording of motion. Integrated infrared illuminators can provide sufficient illumination for navigation in an urban environment, while white light illuminators can be used to identify targets up close. One example is a 1.3 Megapixel camera with mpeg4 compression capabilities.

Figure 14A:
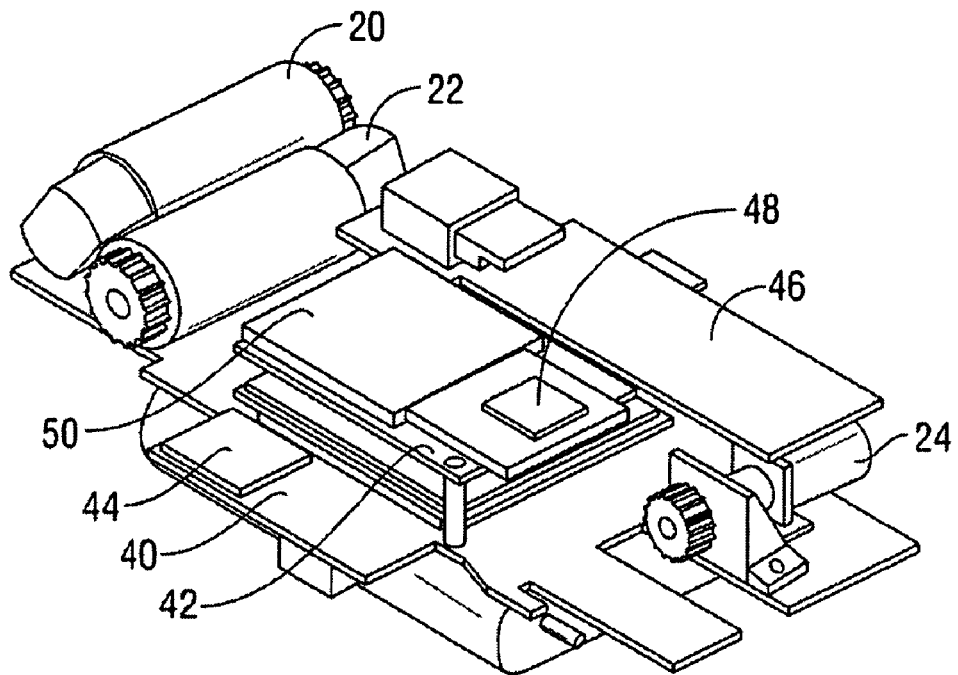
FIGS. 14*a-c* are perspective and like views of an electrical subassembly of a robot.
Figure 14B:
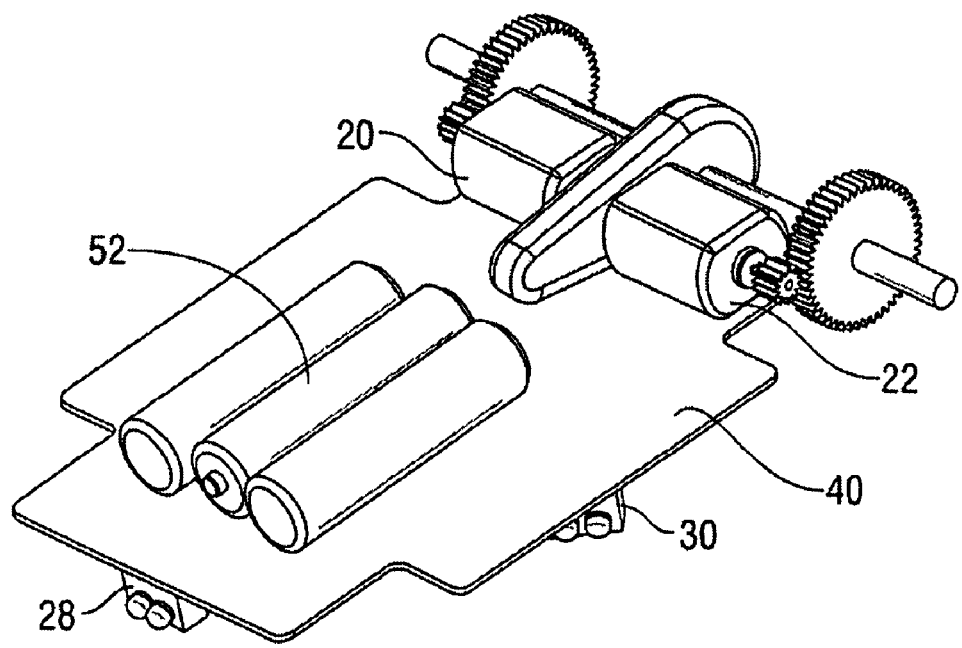
Figure 14C:
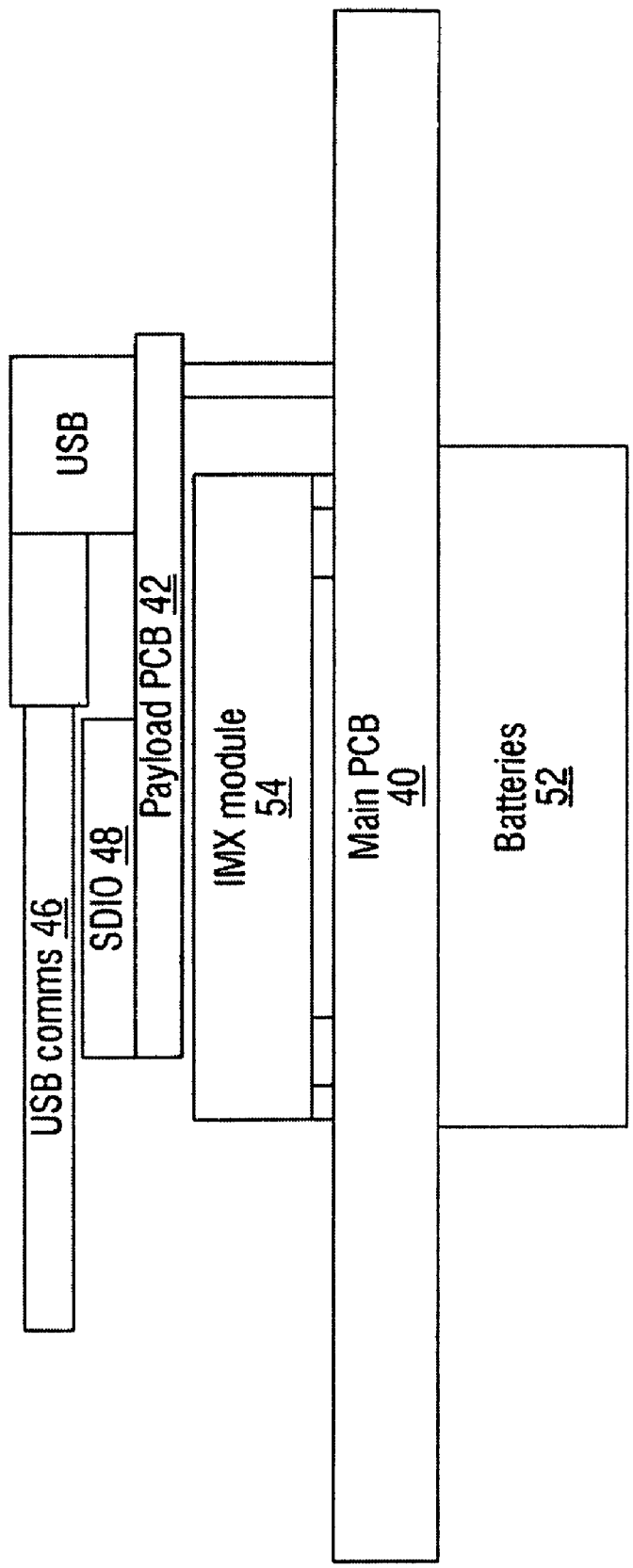

With reference to FIGS. 14a-b, electrical subassembly 26 is mounted between the flipper drive motor 24 and wheel drive motors 20, 22 above batteries 52. Electrical subassembly includes a main printed circuit board (PCB) 40 to which are electrically connected a removable mass memory 44, USB communication module 46: SDIO communication module 48, SDIO port 50. The battery, drive motors 20, 22 and 24, camera 32 and antenna 34 are operably coupled to electrical subassembly 26. PCB 40 also carries end sensors 28 and side sensors 30. PCB 40 can include rigid circuit boards, flexible polyimide circuits, or other circuit modules or combinations thereof, and may provide power regulation, motion control, sensors, and other functions.

Battery 52 includes a lithium ion battery pack with three 18650 cells in series. Each cell has a capacity of 2.6 AHr, and contains 0.78 grams/cell of lithium, or 2.3 g of lithium per assembled robot. Internal rechargeable Li-Ion battery pack 52 has a two hour charge time via 110 v or 220 v circuits. Both robot 2 and the OCU remote control 4 can be charged by a single adapter capable of accepting universal power (100-240 VAC 50/60 Hz). Optional charge adapters can be used for charging at 12-24 VDC. Battery 52 can be attached directly to PCB 40 via VHB tape. Solar power can be used to charge the battery or provide for extended duration low power surveillance.

A substantial capacitor bank is used to minimize the ripple in the battery draw in powering the drive motors. It may be desirable in some cases to destroy internal circuits by reversing the polarity of the capacitor bank into the lithium batteries to ignite the batteries. A sudden reversal of the energy from the capacitors creates a large current surge sufficient to cause an electrical fire. This would help frustrate the ability of hostile warfighters from re-using any of the components.

PCB 40 includes one or more computer processors and associated memory systems. PCB 40 is coupled to communication modules 46, 48, which include, for example, a radio for exchanging control and feedback information with remote control system 4. Communications range with USB and SDIO radios was experimentally found to be approximately 40 meters of open area or through two cinderblock walls of a building.

Odometry sensors detect a pattern referenced to axle 16, such as a slotted or patterned strip secured to an axle, e.g., via a piece of clear heat shrink tubing, or a slotted disc attached to an axle or driven wheel 8. The odometry sensor is located on the idler wheel to account for track slippage on drive wheel 8. Odometry reading accuracy may be increased by harder turns as opposed to sweeping turns.

Additional sensors determine the angle between flippers 14 and chassis 6 and the rate of rotation of flippers 14 or wheels 8 or 10. An angular rate sensor is placed near the center of gravity of the robot 2 to track the bearing of the robot and provide increased positioning accuracy, facilitating movement in areas with few visual landmarks. Optional accelerometers can be located near the angular rate sensor. These inputs are used during full or partial autonomous robot operation.

Figure 15:
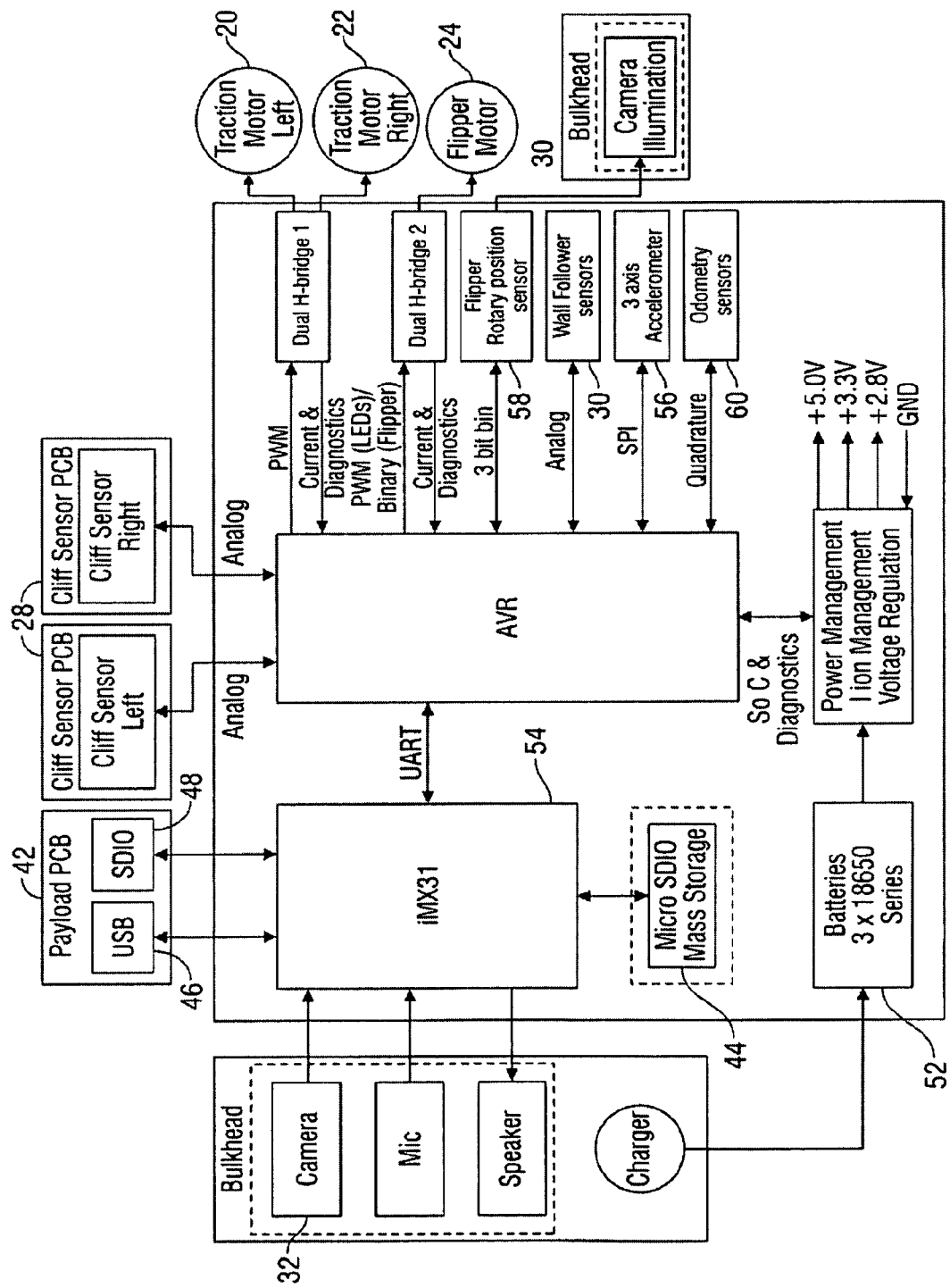
FIG. 15 is a functional block diagram of system components of a robot.

With reference to FIG. 15, a functional block diagram of electrically connected system components of an embodiment of a robot is shown. PCB 40 is electrically connected to an iMX31 processor 54, USB communication module 46, SDIO communication module 48, flash memory 44, infrared sensors 28, proximity sensors 30, STmicro LIS344ALH three axis accelerometer 56, flipper rotary position sensor (RPS) 58, SDIO/USB Payload PCB 42, and STmicro LISY300AL angular right sensor, camera 32, battery 52, drive motors 20, 22 and 24 with appropriate interfaces, controllers and the like.

The electrical components may also include one or more of the following: microphone, yaw sensor, active/passive analog IR LED and phototransistors, SDIO radios, 802.11b/g/n radio, satellite phone, EVDO cellular phone, USB peripherals, additional batteries, Bluetechnix IMX, GPS transponders and the like.

In various embodiments, communications modules 46 and 48 serve to provide multi-hop style communications chains, to extend the usefulness of the robots deep into radio frequency (RF) denied areas using standard Optimized Link State Routing daemon (OLSRd) software mesh networking. The robots can be repositioned to maintain a self healing communications network According to one method of establishing a mesh network, the deactivation plug is removed to activate each robot. The robots are then placed in approximate locations for autonomous mesh networking. The robots automatically reposition to maintain the mesh network.

Advantageous Mesh Network Capabilities are disclosed generally in the LANdroids Bidders Day Briefing, Document Number BAA 07-46, released Jul. 6, 2007 and available from DARPA.

When the mission is over, the robots can be recovered as required and charged to be ready for the next mission. When the robots are not in use and not being charged, the deactivation plugs are installed into the charge connectors to power off the robots and keep the batteries from draining prior to the next mission.

A number of embodiments of the invention have been described. Nevertheless, it will be understood that various modifications may be made without departing from the spirit and scope of the invention. For example, alternative embodiments can include four or six driven wheels and a single or multiple trailing pivoting arms. Accordingly, other embodiments are within the scope of the following claims.

What is claimed is:

1. A method for operating a mobile robotic vehicle to surmount a series of stair risers, comprising:
   driving a support surface to propel the vehicle to place the support surface in contact with the riser of a first stair below an uppermost edge of the first stair riser;
   further driving the support surface to cause the forward end of the vehicle to ascend the riser of the first stair, the support surface generating sufficient traction against the riser to climb the riser as the support surface is driven;
   pivoting a first pivoting trailing arm to raise a rearward end of the vehicle while the forward end of the vehicle is supported by the first stair;
   driving the support surface to advance the forward end of the robot over the uppermost edge of the first stair riser;
   pivoting the arm to further raise the rearward end of the vehicle such that the forward end of the vehicle tips downward beyond the uppermost edge of the riser of the first stair; and
   repeating the driving and pivoting to surmount a second stair of the series of stair risers.

2. The method of claim 1, further comprising pivoting the arm to raise the forward end of the vehicle to assist in ascending the first stair.

3. The method of claim 1, further comprising pivoting the arm to flip the robot endwise.

4. The method of claim 1, wherein raising the forward end of the vehicle raises a radio transceiver on the vehicle.

5. The method of claim 1, further comprising supporting the vehicle in a first substantially horizontal orientation on an underlying surface and pivoting the arm to contact the underlying surface to raise the forward end of the vehicle past a stable point, and allowing the vehicle to topple over to a second orientation inverted with respect to the first orientation.

6. The method of claim 1, wherein pivoting the first arm and driving the support surface are performed simultaneously.

7. The method of claim 1, wherein pivoting the first arm and driving the support surface are performed substantially asynchronously.

8. The method of claim 1, wherein the support surface propels the vehicle to a predetermined angle of incline before the first arm is initially pivoted to raise the rearward end of the vehicle.

9. The method of claim 1, wherein the first arm is pivoted at a predetermined rate for a predetermined period upon detection of a predetermined angle of incline of the vehicle.

10. The method of claim 1, further comprising determining that a center of gravity of the vehicle has not cleared the uppermost edge of the first stair and pivoting the arm rearward to topple the vehicle forward from a possible teetering position.

11. The method of claim 1, wherein pivoting the first arm to raise a rearward end of the vehicle as the forward end of the robot ascends the riser of the first stair comprises pivoting the arm at a first rotational speed and, after pivoting the arm at the first rotational speed, pivoting the arm at a second rotational speed greater than the first rotational speed.

12. The method of claim 1, further comprising driving the support surface along a run of the first stair to a riser of the second stair.

13. The method of claim 1, wherein the vehicle substantially fits within a bounding volume approximately 7 inches long, 5 inches wide and 2 inches tall, and wherein the first stair riser is 8 inches or less in height.

\* \* \* \* \*